United States Patent

[11] 3,597,727

[72] Inventors Roger D. Judson
 Houston, Tex.;
 Robert J. S. Brown, Fullerton, Calif.; Ian
 R. Malarky, La Habra, Calif.
[21] Appl. No. 787,788
[22] Filed Dec. 30, 1968
[45] Patented Aug. 3, 1971
[73] Assignee Chevron Research Company
 San Francisco, Calif.

[54] METHOD OF ATTENUATING MULTIPLE SEISMIC
 SIGNALS IN THE DETERMINATION OF INLINE
 AND CROSS DIPS EMPLOYING CROSS-STEERED
 SEISMIC DATA
 24 Claims, 15 Drawing Figs.

[52] U.S. Cl. ..................................................... 340/15.5
[51] Int. Cl. ....................................................... G01v 1/00
[50] Field of Search ......................................... 340/15.5
 CP

[56] References Cited
 UNITED STATES PATENTS
 3,346,068 10/1967 Woods et al. .................. 340/15.5
 2,329,721 9/1943 Hoover et al. .................. 340/15.5

Primary Examiner—Rodney D. Bennett, Jr.
Assistant Examiner—Joseph G. Baxter
Attorneys—A. L. Snow, F. E. Johnston, R. L. Freeland, Jr. and H. D. Messner ABSTRACT: A method for collecting and processing seismic data to determine the attitude of strata below the surface of the earth. A spread of seismic detectors is employed in conjunction with an array of obliquely aligned seismic sources (oblique with respect to a survey line at the surface of the earth) such that (i) center points between all possible source-detector pairs form a grid of center points having sets of cross-aligned center points perpendicular to the line of survey, yet (ii) respective pairs of detector station-shot points associated with any one set of cross aligned center points have appreciably different horizontal spacings. Multitrace records of seismic data are produced representing energy reflected from said strata after initiation of each seismic source individually. These traces are rearranged and then processed by the technique known as beam steering to produce traces that not only provide directional information as to the emergence angle of the reflected energy from said strata but also significantly attenuate multiple reflected signals present in the original traces.

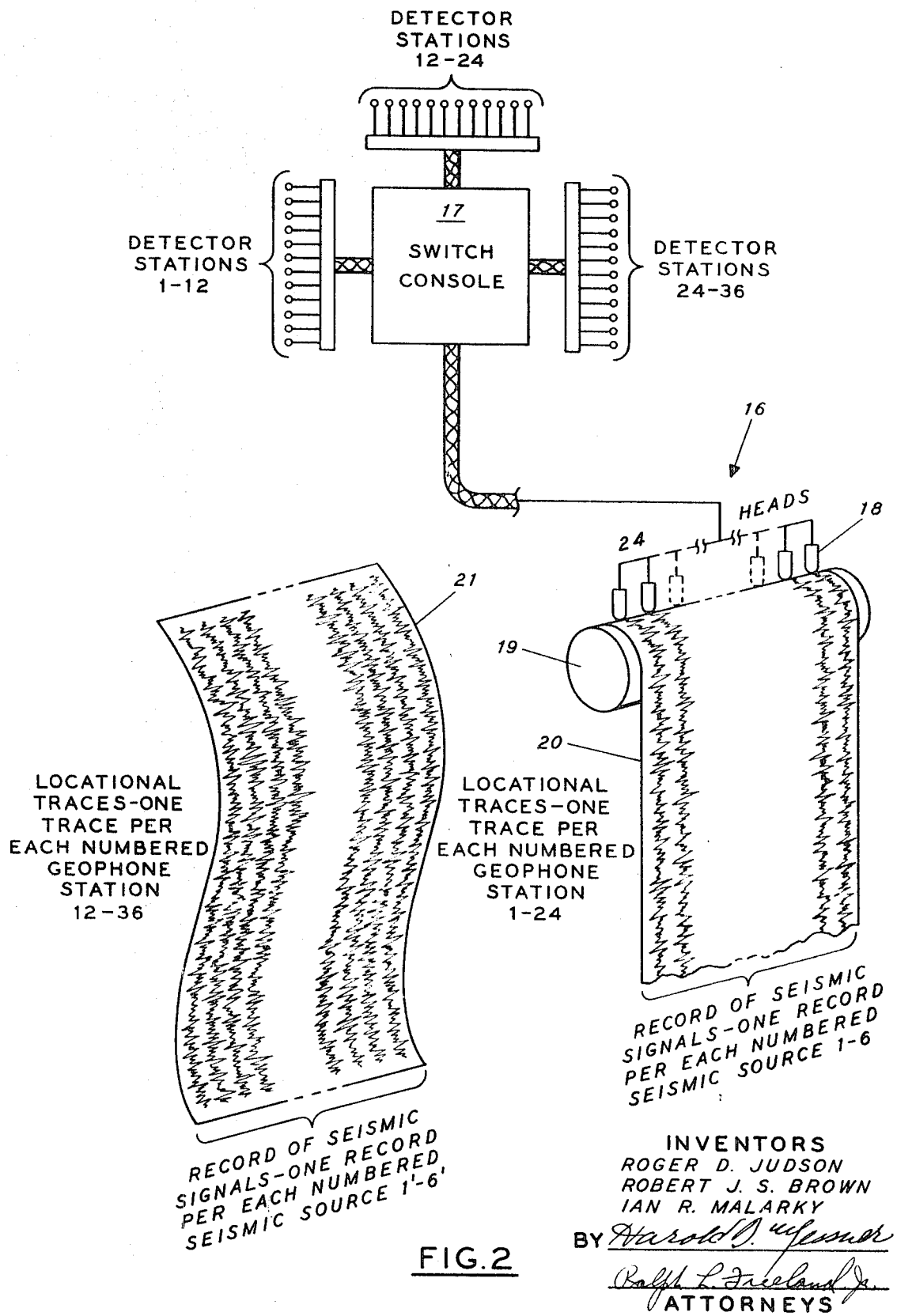

INVENTORS
ROGER D. JUDSON
ROBERT J. S. BROWN
IAN R. MALARKY
BY
ATTORNEYS

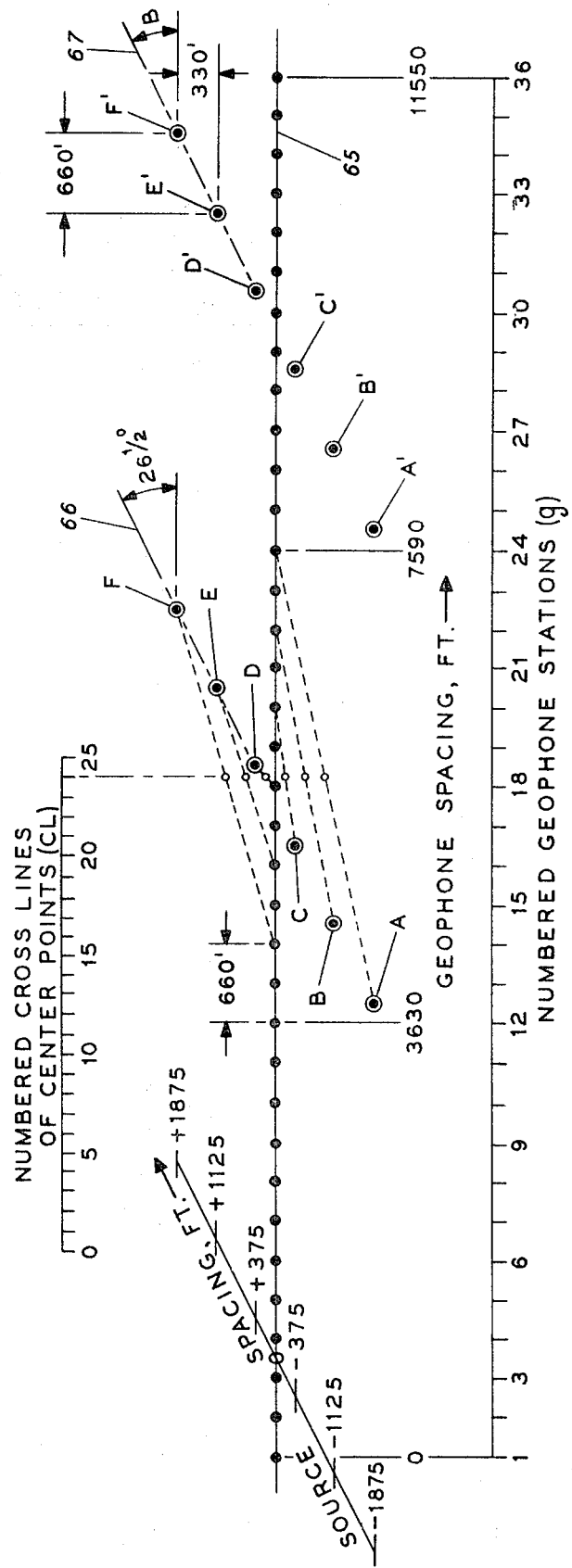
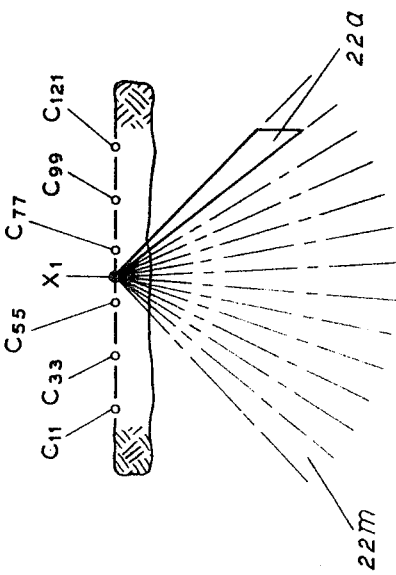
FIG. 13
FIG. 5

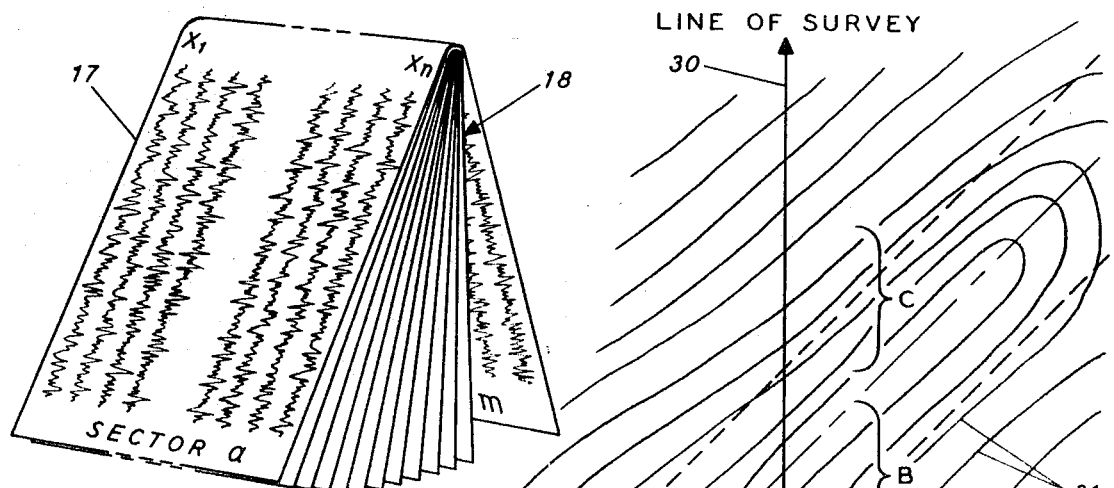
FIG. 7
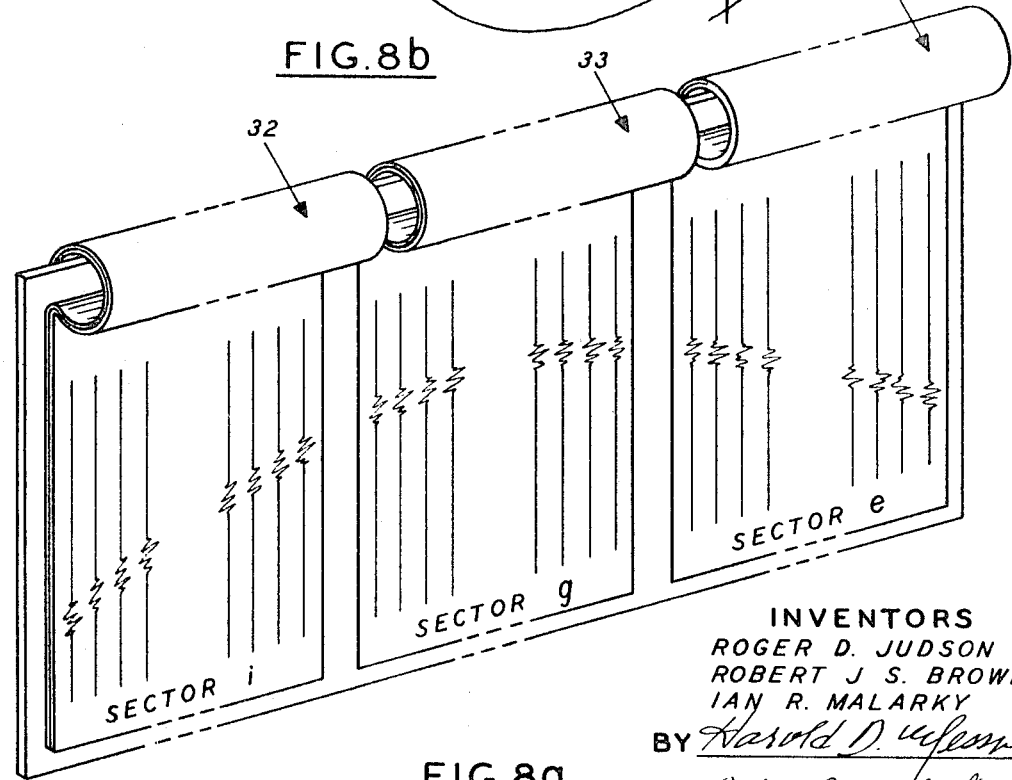
A B C { AREA COVERAGE PER EACH 24 CROSS LINES OF CENTER POINTS INTERSECTING THE LINE OF SURVEY AT 90°
FIG. 8b
FIG. 8a
INVENTORS
ROGER D. JUDSON
ROBERT J S. BROWN
IAN R. MALARKY
BY *Harold D. Gesmer*
*Ralph L. Freeland, Jr.*
ATTORNEYS

FIG. 9

METHOD OF ATTENUATING MULTIPLE SEISMIC SIGNALS IN THE DETERMINATION OF INLINE AND CROSS DIPS EMPLOYING CROSS-STEERED SEISMIC DATA

This invention relates to geophysical prospecting methods for exploring subsurface stratal configurations by means of seismic prospecting techniques. More particularly, the invention relates to a method for collecting, processing, and displaying seismic information by means of a detector spread and source point array arranged so that the recorded seismic data represents individual center points spaced across the earth's surface. Still more particularly, the invention relates to a method for collecting, enhancing and displaying areally recorded seismic information containing multiple seismic traces in a manner which permits true visualization of three-dimensional subsurface strata within the surveyed earth formation.

Conventional seismology works best when the structures being identified have their maximum depth variations in the direction of the line of survey. Seismic techniques involved in the present invention are not so limited and have the advantage of being useful where the recorded seismic data include multiple-reflection signals (signals reflected more than once in the subsurface), and/or where the maximum depth variations indicated by the data run oblique or perpendicular to the line of survey.

Today, geophysical prospecting crews commonly position an array of seismometers or geophones to detect seismic waves from an explosion or other seismic sources at or below the surface of the earth, and record, as by means of a recorder, the arrival of seismic waves as a function of time. The resulting seismic record is made up of a plurality of traces, the number of which corresponds to the number of geophone locations or geophone group locations used. The record usually is initially processed by applying static and dynamic corrections to the traces so that the resulting corrected record may be more easily interpreted by a seismologist to indicate the configuration of the underlying strata. Primary signals, or wavelets, appearing in the processed traces represent seismic waves arriving at the geophones from stratal seismic reflectors or other discontinuities within the earth. Similarly, multiple signals appearing in the processed traces represent waves arriving at the geophones from more than one reflector in the earth. The manner in which each signal differs from, or is similar to, and "lines up" as compared to other signals along each trace, say as by time of arrival, magnitude and wave shape, or all three, allows inference to be made as to the locational identity of the underlying strata.

By noting the gradual change in arrival time from trace to trace of a signal representing reflections from a particular formation along the line of survey, for example, changes of the subsurface elevational change of that particular formation (called a reflection-wave event) in the direction of the line of survey can be inferred. For example, if the particular formation seems to become shallower as evidenced by the "line up" of signals on a number of traces, and then seems not to change in elevation through a succeeding number of traces, and finally seems to become deeper again in a further succeeding number of traces, it can be inferred that the survey crossed an anticlinal structure. However, it will be appreciated that in collecting data along only a single line of survey, an anticline whose axis is parallel to that line of survey may go undetected.

Furthermore, where the array of geophones and seismic sources are separated by large horizontal distances common in today's seismic exploration operations, the primary signals related to common relfection-wave events may be difficult to identify. Not only do these records usually contain a large number of informational and noise wiggles per unit length of record, but further, they also often have information-noise levels that are difficult to separate due to, among other things, the low signal-to-noise and primary-to-multiple ratios of the recorded signals.

The prior art recognized to a certain degree the above-mentioned problems. It proposed methods to assist in the economical collection, processing and interpretation of seismic data by means of conventional record profiles giving the appearance of a group of traces recorded along a vertical plane intersecting a line of survey at the earth's surface. In one such method, called the "roll-along" common depth point (CDP) method, record profiles having high primary-to-multiple ratios are collected in the field using an offset shot point and detector array having ultralong maximum horizontal spacings chosen so that the path lengths of seismic energy to and from common depth points in the formation are unequal. For example, the source is positioned at a constant offset distance to the nearest detector station. A first recording is made with the source and detector spread in one location; then, a second recording is made with the source advanced a certain distance relative to the detector spread. The detector spread is advanced a similar distance. By moving the source and detector spread the same given distance, say the equivalent of the spacing between detector stations, seismic traces can be recorded which covered the same subsurface reflection point several times. Through composition of common depth point signals related to a given reflection point after normal moveout and static corrections, primary wave events in the combined traces add in phase and become enhanced, while noise, including multiple signals in the traces, is attenuated. Since the primary wave events relate to common depth points, the maximum horizontal spacing between endpoint detector-shot point pairs can be quite long in the case of gently sloped strata so as to provide for economical exploration operations.

However, none of the aforementioned prior art methods have combined systematic collection of seismic data over a large two-dimensional surface area with systematic beam steering processing techniques to provide seismic information of high signal-to-noise and high primary-to-multiple ratios which can be displayed in a manner which permits true visualization of three-dimensional stratal configuration within the surveyed earth formation. The beam steering method is described in a copending application of Lee P. Stephenson, Ser. No. 416,947, filed Sept. 25, 1964, for "Method for Processing Surface Detected Seismic Data to Plotted Representations of Subsurface Directional Seismic Data." The suppression of multiple signals in relation to data representing a one-dimensional line of center points is described in an article of W. Harry Mayne entitled "Common Reflection Point Horizontal Data Stacking Techniques" (*Geophysics*, Vol. XXVII, No. 6, Part 1, Dec. 1962, pp. 927—938).

In one embodiment of the present invention a line of geophones with regularly spaced cross lines of seismic sources intersecting the geophones at a common oblique angle is employed to give a uniform continuous distribution of subsurface reflection points within a volume of the subsurface formation extending adequate cross offset distances to each side of the line of survey. With this uniform subsurface coverage coupled with simultaneous reduction in multiply reflected signal amplitude, seismologists are able to determine the in-line and cross dip of the subsurface formation continuously at points along the line of survey. With these dip data a three-dimensional structure can be produced even though the plane axis of the subsurface structure is oblique to the line of survey.

In all embodiments of the present invention, the final traces used to infer the subsurface structure not only represent those subsurface structures throughout a continuous finite volume, but the traces themselves, being collected with a detector spread and shot point array having appreciably different horizontal distances separating affiliated shot point-detector station pairs, as well as being later processed by a process called beam steering, provide cross-steered seismic information having both higher signal-to-noise and primary-to-multiple ratios than original, conventional traces.

The field and office procedure of one embodiment of the present invention is as follows: an array of shot points is arranged along a series of oblique lines intersecting an in-line array of geophones at a common angle so that the center points between each shot and each geophone will form a two-dimensional grid of center points. The grid lines of the center points are preferably of uniform spacing across the earth's surface, and the horizontal distances between individual pairs of shot points and detector stations associated with sets of center points normal to the line of survey are appreciably different. The center points will have a density of the order of four points per square wave length of the dominant seismic signals produced by the seismic source. Further, the source and geophones will be preferably spaced so that the endpoint shot point will be spaced from the line of survey offset horizontal distances that will provide for suitable resolution of reflection-wave events in the records, in direction and magnitude.

One aspect of the present invention, the detector spread is coincident with the line of survey and the shot points extend along a series of oblique imaginary lines symmetrical about the detector spread and intersecting the spread at a series of intersection points equally spaced along the line of survey. The magnitude of the oblique angle of intersection and the spacing of the detector spread and shot point array are varied so as to provide significant differences in horizontal spacing between respective pairs of detector stations and shot points used to record traces associated with the sets of center points grouped along lines normal to the line of survey.

The shots will be shot separately and individual records of the signals produced at each of the geophone locations will be made so that there will be a separate trace for each geophone station. For example, a first recording is made using the source closest to the detector spread; then a second recording is made with the source advanced a certain oblique distance to a position more remote from the detector spread.

The spread may either remain stationary during a predetermined sequence of shots, say six, or may be relocated after each shot to simulate conventional roll-along collection techniques. With regard to the latter, the detector spread is advanced along the line of survey an in-line distance equal to the same in-line advancement of the source. By moving the source and detector spread the same in-line distance, say the equivalent of the spacing between two detector stations, seismic traces will be produced which cover a grid of subsurface reflection points of uniform density in an economical and efficient fashion.

Each of the individual traces will then be statically and dynamically corrected so as to produce a trace which will be associated with a shot point-geophone station center point of a two-dimensional array of center points. The total number of traces is equal to the product of the number of shots and the number of geophone locations (or geophone group locations if several geophones are used in each group).

Then the subgroups of traces containing the traces representing crosslines of center points in lines substantially perpendicular to the line of survey will be processed by subgroups, by a method known as beam steering, to produce a new subset of traces representing azimuthal directional information existing in the original subgroup of traces. Simultaneously, multiply reflected signals in the original traces will be suppressed relative to primary signals without affecting other subsets of traces representing azimuthally directional information associated with adjacent sets of central points normal to the line of survey.

Adjacent subgroups of traces grouped by their cross center point relationship to the in-line survey direction, are likewise processed to also produce respective sets of azimuthally directional traces having higher signal-to-noise ratios as well as higher primary-to-multiple ratios than the original conventional traces. To produce each subset of directional traces with sufficiently high primary-to-multiple ratios, the incremental horizontal space factor, Dmax–Dmin, provided by the geophone-source field array can be a range of 1000 feet to 10,000 feet, with a range of 3000 feet to 8000 feet being preferred, where "Dmax" is defined as maximum horizontal spacing between a source-detector pair producing one of the subgroups of traces associated with a crossline of center points normal to the line of survey, and "Dmin" is the minimum horizontal spacing of another source-detector pair in the same crossline of center points.

From these directional traces, indications of the cross moveout for an event can be obtained. Further, when a group of directional traces from separate subsets of directional traces is considered collectively at a certain common, but maximum cross moveout for a primary signal event, the in-line moveout (perpendicular to cross moveout) for the same event can be determined in a conventional manner, the differences being that the traces over which the differences in arrival times are determined represent wavelets recorded from a common azimuthal direction measured with respect to different in-line locations along a line coincident or at least parallel to the line of survey. In this way the cross and in-line dip of the subsurface is reliably presented.

Directional traces associated with each subgroup of traces representing a line of center points normal to the line of survey may be displayed as a function of different cross moveouts but common in-line coordinate locations to produce a series of cross profiles centered at selected coordinate points. Or, a group of these profiles may be assembled as a new form of in-line profile section containing selectively cross-steered seismic data representing subsurface reflectors extending at a common azimuthal direction from the vertical plane along and through the line of survey as if they were conventional cross sections extending along a line coincident or at least parallel to the line of survey.

Objects of the present invention include the provision of a method for determining in-line and cross dips of subsurface formations from cross-steered seismic information having high signal-to-noise and primary-to-multiple ratios, the information originating and being collected over a two-dimensional surface area of the earth using a detector spread and shot point array having (i) adequate horizontal cross offset dimensions, and (ii) appreciably different horizontal distances separating respective shot point and detector stations used to record traces associated with center points aligned along imaginary lines at right angles to the line of survey.

In a copending application of Robert J. S. Brown, Ian R. Malarky, and Francis G. Blake, Ser. No. 701,145, filed Jan. 29, 1968, now U.S. Pat. No. 3,529,282, issued Sept. 15, 1970 for "Method for Determining In-Line and Cross Dip Employing Cross Steering of Seismic Data," there is described and claimed for systematically collecting, processing and displaying seismic information with respect to a two-dimensional grid of center points using an areal-positioned detector spread and source point array in a manner which permitted true visualization of three-dimensional subsurface strata within the earth formation of interest. In the aforementioned patent, reference is made to the use of geophone and source arrays aligned along lines that intersect each other at selected angles. Included within that description are oblique alignments of the in-line and cross arrays. However, that invention as there described, was not intended to describe or claim oblique alignments of in-line and cross geophone and source arrays for the purposes herein described and claimed, viz, suppressing multiply reflected seismic signals in the seismic data as cross steering of the data occurs.

Other objects, features and advantages of the invention will be made apparent from the following detailed description taken in conjunction with the following accompanying drawings in which:

FIG. 1 is a plan view of an earth formation including a reflecting subsurface horizon illustrating the method of the present invention for systematically producing a series of locational traces associated with individual center points between respective seismic source-geophone pairs of an array of geophone and sources, the traces capable of being associated with center points perpendicular to the line of survey, having substantially different source-to-geophone horizontal spacings;

FIG. 2 is a schematic diagram of seismic recording equipment useful in obtaining the locational traces of FIG. 1;

FIG. 5 is an elevational view of the earth formation taken along arrows 10–10 of FIG. 1 schematically illustrating various formational sectors which can be investigated using beam steered directional traces derived from cross aligned sets of traces produced by the array of FIG. 1;

FIG. 7 is a perspective view of a set of processed, cross-steered record tapes produced in accordance with the present invention;

FIGS. 8a and 8b illustrate one use of the processed beam steered records of FIG. 7; FIG. 8a is a perspective view of three sets of cross-steered processed records and 8b is a plan view of a possible subsurface earth formation which could produce the records of FIG. 8a;

FIG. 9 is a schedule of locational traces produced by the array of FIG. 1 illustrating their systematical regrouping in accordance with particular cross center point location and alignment;

Figure 1:
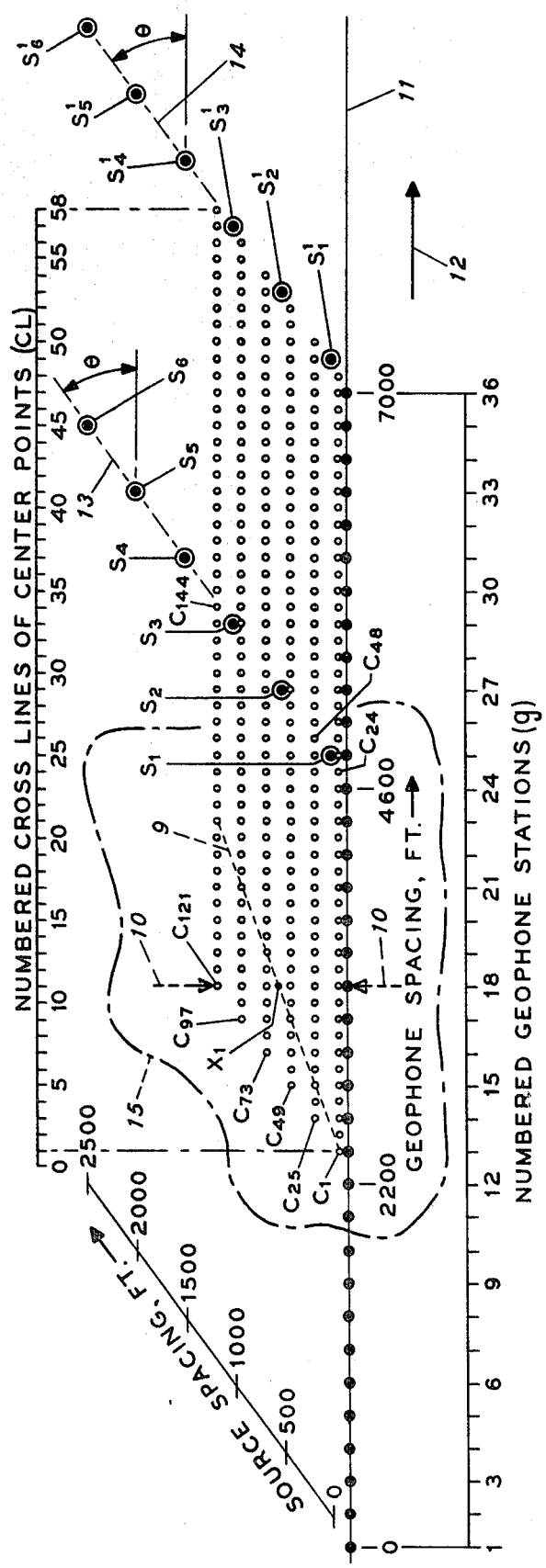
Figure 14:
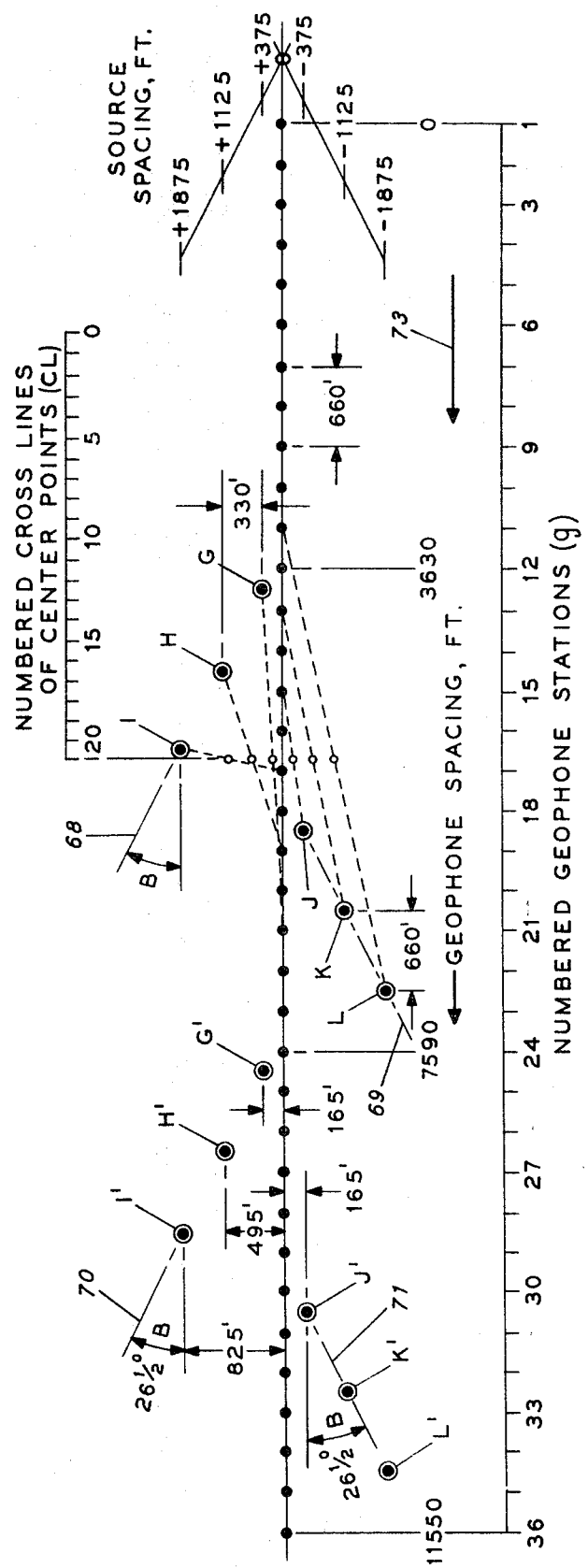
Figure 11:
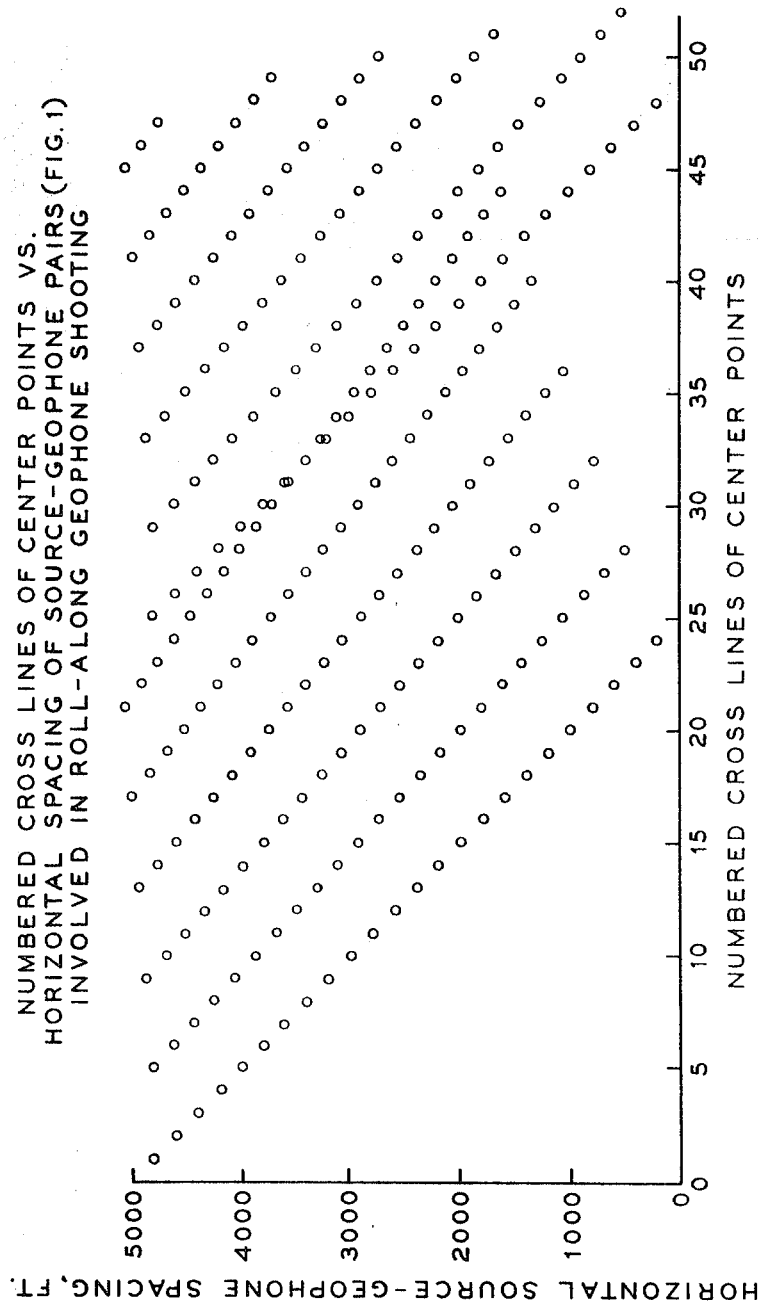
Figure 12:
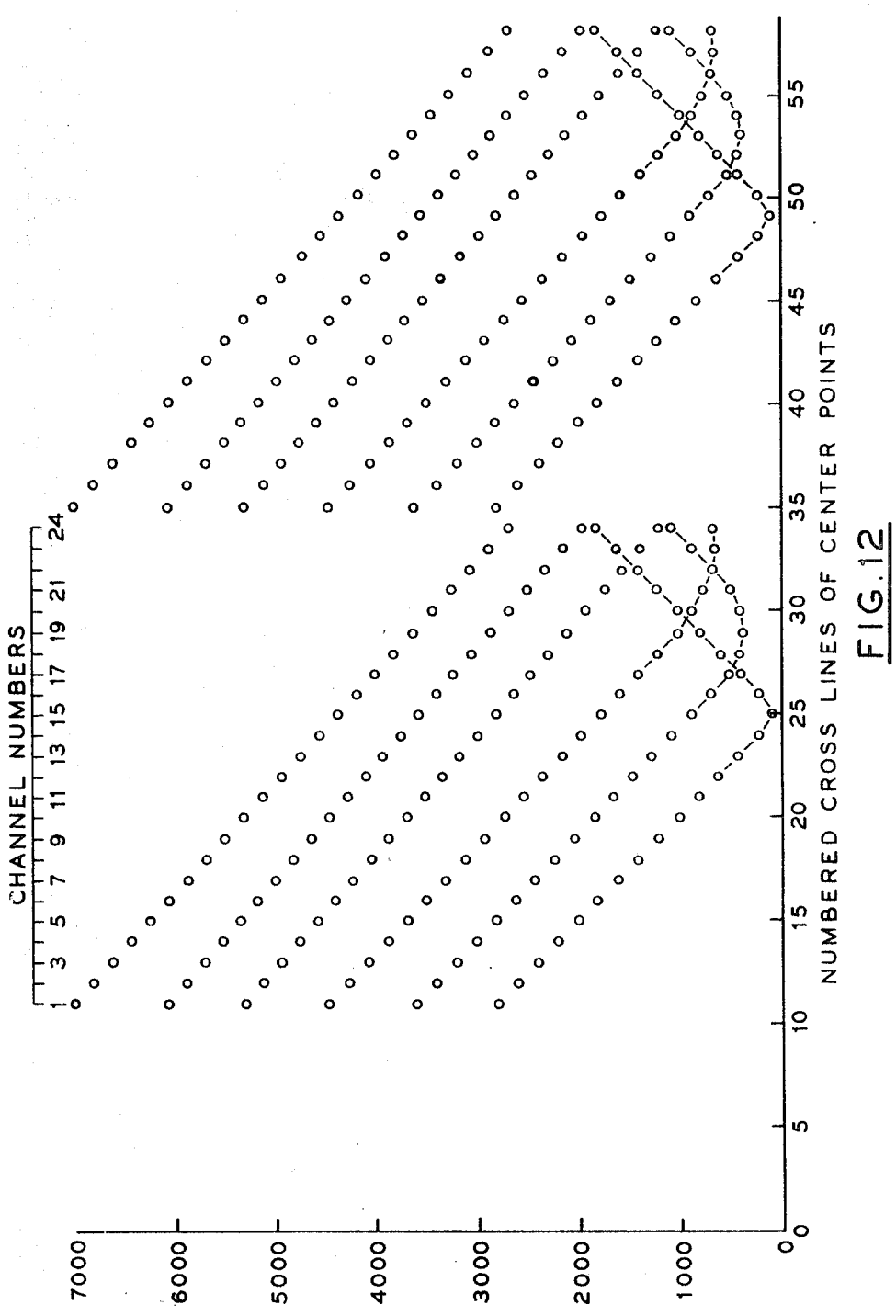

FIGS. 11 and 12 illustrate the variation in source-to-geophone spacing for the array of FIG. 1 in which collection of the seismic data has been achieved using conventional "roll-along" field recording techniques and "reverse roll-along" recording techniques, respectively; and FIGS. 13 and 14 illustrate alternate arrays of geophones and seismic sources for efficient collection of seismic data in accordance with the present invention.

In broad terms, the present invention discloses a method for aiding in the determination of the three-dimensional stratal configuration of subsurface strata and illustrates a field procedure for obtaining locational traces capable of being associated with a two-dimensional center point grid pattern overlying the three-dimensional subsurface structure of interest. Each center point is located midway between an individual source-geophone pair associated with a particular locational trace.

The geometry of the source-geophone array is thus critical. In this regard, it has been found that the geometry of the array should have at least the following characteristics and features:

1. the resulting locational traces must be capable of being associated with crosslines of center points substantially perpendicular to the line of survey;
2. each cross set of locational traces associated with crosslines of center points must be produced by individual geophone-source point pairs which provide a rather large horizontal incremental spacing factor, as previously defined, and
3. maximum total horizontal offset of individual cross aligned center points must be sufficient that cross sets of traces associated therewith produce statistically reliable cross-steered traces after the locational traces are grouped and processed in accordance with the teachings of the present invention.

Each center point can be said to be representative of a reflection point on a subsurface stratum. If the stratum of interest, hypothetically speaking, is a horizontal flat horizon and the energy is assumed to travel along straight line ray paths, the reflection point lies directly below the center point. Each center point also can be thought of and referred to with reference to a particular locational trace. Center points associated with these locational traces are constructed as follows: A series of imaginary lines are drawn between each source point and each geophone station. The center point of each line is midway along each imaginary line. Furthermore, since each center point relates to a particular source point-geophone pair, each locational trace can be thought of and referred to as having a particular source point-to-geophone spacing.

FIG. 1 illustrates a two-dimensional grid of center points produced by the field procedure of the present invention. In the field procedure, a series of geophone stations, such as geophone stations $g_1$, $g_2$...$g_{36}$, are placed along spread line 11. The direction of survey is indicated by arrow 12. Aligned along a series of oblique lines intersecting the geophone spread is a series of source points formed at $S_1$, $S_2$, etc. For illustrative purposes, source points $S_1$, $S_2$...$S_6$ are shown in alignment along oblique line 13 intersecting the line of survey at an angle $\theta$. Similarly, source points $S'_1$, $S'_2$...$S'_6$ are shown in alignment along line 14 also intersecting the line of survey at the same angle $\theta$.

When seismic sources are located at the source points illustrated in FIG. 1 and energized, in sequence from left to right as viewed, locational traces are produced capable of being grouped with center points aligned perpendicular to the line of survey.

For example, a seismic source positioned at source point $S_1$ is energized to cause an omnidirectional three-dimensional wave front to propagate from the source point down through the earth. As variations in acoustic impedance are encountered within the earth such as at a reflection or depth point on a hypothetical, flat subsurface horizon 15 shown in phantom line, portions of the energy are reflected. Geophones at selected geophone stations $g_1$—$g_{24}$ convert the mechanical movement of the earth as produced by reflected waves to electrical signals which are recorded in a suitable form.

Recordings of the electrical signals at the geophone stations $g_1$—$g_{24}$ are made by a recorder 16, as shown in FIG. 2. Recorder 16 connects to the outputs at the geophone at stations $g_1$—$g_{24}$ through a switching console 17 and amplifying equipment, not shown. Recorder 16 includes recording heads 18 and drum 19 about which is wound the field record tape 20. Each field record tape 20 is identified by both the seismic source producing the energy, viz, the source at each source point, and the geophone stations receiving the reflected energy, viz, stations $g_1$, $g_2$, $g_3$...$g_{24}$. A total of six field records of 24 locational traces each are produced by the geophone stations $g_1$—$g_{24}$ and by the separately fired sources at source points $S_1$, $S_2$, $S_3$...$S_6$.

The field procedure is then repeated at new geophone-source point locations in the direction of arrow 12; that is to say, the recorder 16 of FIG. 2 is disconnected from geophones at, say, stations $g_1$—$g_{12}$ and connected to geophones, say at stations $g_{13}$—$g_{36}$ through actuation of switch console 17. As new sources at the source points $S'_1$, $S'_2$, $S'_3$...$S'_6$ are energized, seismic energy is received at the geophone stations $g_{13}$—$g_{36}$ to produce a new field tape 21 as shown in FIG. 2. By virtue of the allied offset position of the source points $S'_1$, $S'_2$...$S'_6$ with the source points $S_1$, $S_2$...$S_6$, precise alignment of the locational traces of tape 21 with the earlier produced traces of tape 20 is achieved. It should be noted in FIG. 1 in this regard that the source points $S_1$, $S_2$...$S_6$ and the geophone stations $g_1$—$g_{24}$ define several rows of center points, e.g., center points $C_1$—$C_{24}$, center points $C_{25}$—$C_{48}$ ... center points $C_{121}$—$C_{144}$ having their midpoints positioned along lines parallel to the line of survey, while other source points $S'_1$, $S'_2$...$S'_6$ and the geophone stations $g_{13}$—$g_{36}$ provide additional center points not only capable of being grouped in crosslines perpendicular to the line of survey, but also they are seen to be aligned with the previous series of center points $C_1$—$C_{144}$ of FIG. 1.

Adjacent center points mark the intersection of any set of two adjacent lines parallel to the line of survey with a common line normal to the line of survey and determine the density of the center point locations. Where center point density is uniform, the geometric spacing of the center point locations in the in-line direction must be a constant value, as shown in FIG. 1.

Efficiency of the field procedure can be enhanced by the use of three separate geophone strings of 12 geophones, each in selective connection with switch console 17. After locational traces have been produced using, in sequence, sources at seismic source points $S_1$, $S_2$...$S_6$ and geophones at geophone stations $g_1$—$g_{24}$, the geophones associated with stations $g_1$—$g_{12}$ can be quickly disconnected from the recorder through the actuation of switch console 17. As locational traces are again produced at the recorder in association with sources at source points $S'_1$, $S'_2$...$S'_6$ and geophones at geophone stations $g_{13}$—$g_{36}$, the previously disconnected geophone string can be repositioned in alignment with the geophone spread beginning at a new geophone station spaced just to the right, as viewed in FIG. 2, of geophone station $g_{36}$.

The spacing between adjacent geophone stations and source points determines the geometric position of each locational trace. This relationship can be better understood by referring again to FIG. 1. In FIG. 1, the locational traces have been delineated in accordance with the teachings of this invention to relate horizontal spacing of each locational trace to the actual spacing of a source-geophone array used in the field. FIG. 1 is seen to indicate, along the bottom of the plot, geophone station location and the in-line spacing between source points and geophone stations. Along the left-hand side, the oblique offset spacing of the source points is indicated; across the top of the FIGURE, the positions of the transverse aligned center points and locational traces are indicated. As shown, in-line components of source point spacing as well as in-line spacing of the geophones have constant incremental values, but have absolute values which are not necessarily equal to each other. For example, the in-line component of spacing between source points is approximately twice that between detector stations for an array having the following dimensions:

| Item | Dimension |
| --- | --- |
| Source points | |
| Oblique Offset Spacing | 500' |
| In-line Spacing Component | 400' |
| Cross Spacing Component | 300' |
| Angle of Intersection of the Geophone Stations, $\theta$ | 36°52' |
| Center Points | |
| In-line Spacing | 100'Cross Spacing |
| Total Cross Offset Length (e.g., between points $C_{11}$—$C_{121}$) | 750' |
| Geophone Stations | |
| In-line Spacing | 200' |

Oblique spacings between the adjacent source points are preferably incrementally constant along each line but increase in absolute values with respect to the line of survey. The cross component ($y$) of the line intersecting the source points relates to the in-line component ($x$) and the center point spacing of FIG. 1 in accordance with:

$$y = \left(2\frac{md}{ng}\right)x \quad (1)$$

where $d$ is the offset spacing interval of adjacent center points, $g$ is the in-line spacing interval of adjacent center points, $n$ is an integer identifying the geophone station, and $m$ is an integer identifying the midpoint between a respective source-geophone pair.

And, the angle of intersection ($\theta$) of each line of source points is related to both the in-line spacing ($g$) and the cross spacing ($d$) of the center points in accordance with:

$$\theta = \tan^{-1}(2d/g) \quad (2)$$

where symmetry of adjacent center points is desired (i.e., where $d=g$), the angle of intersection ($\theta$) should be about 26½ degrees.

Figure 3:
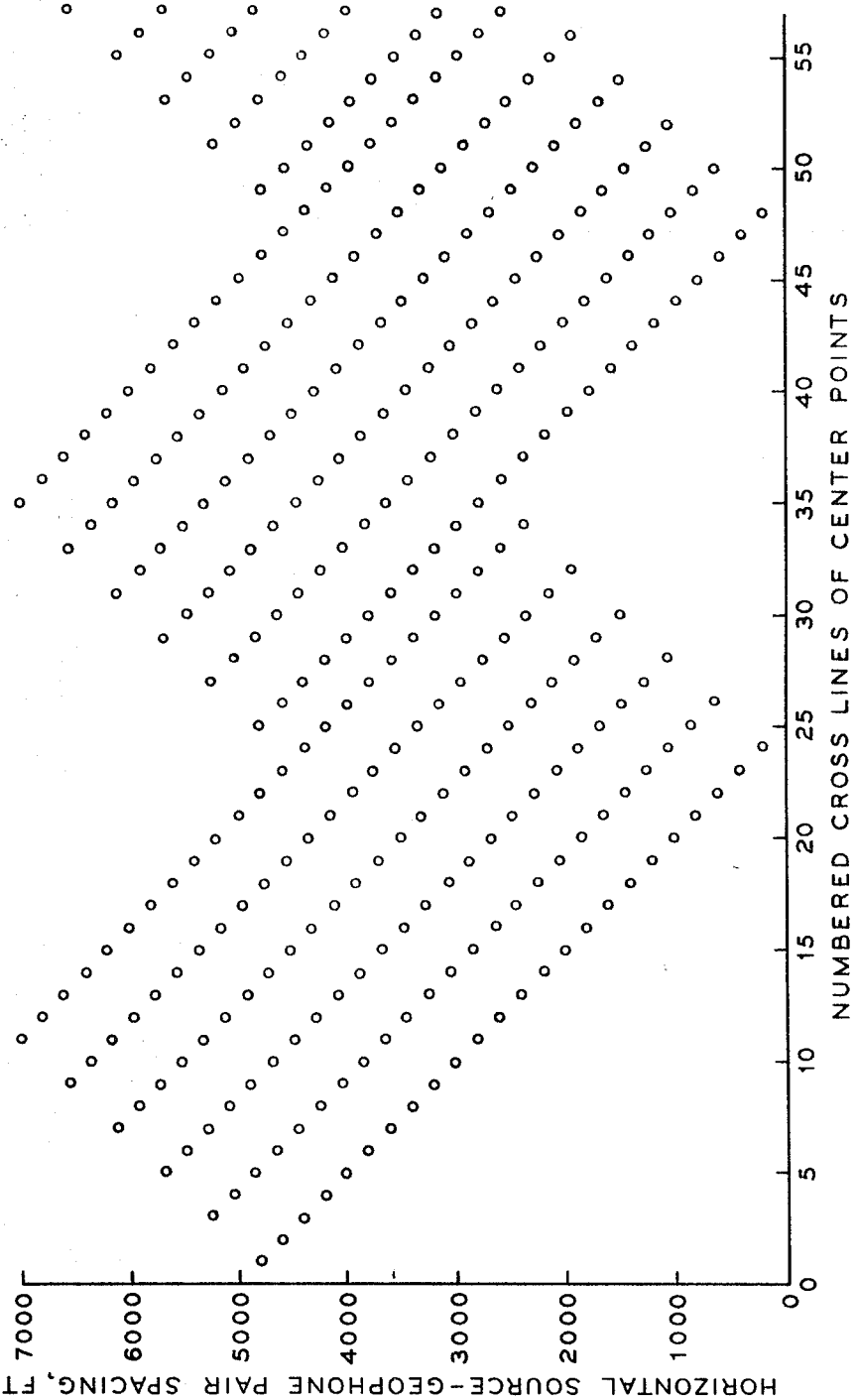
FIG. 3 is a plot of the horizontal source-to-geophone spacing of the array of FIG. 1, illustrating how the horizontal spacing varies within each cross set of center points.

Each recorded locational trace identifies a portion of energy reflected from a hypothetical depth point assumed, for preliminary analytical purposes, to be located directly below a center point so that, in FIG. 1, each center point, as previously mentioned, can be referred to as a locational trace. It is also evident that each locational trace may be referred to as having a particular horizontal geophone-to-source spacing associated with its particular center point. For example, in FIG. 3, the horizontal geophone-to-source spacing associated with each locational trace of a set of traces is plotted as a function of center point location. In this plot, the horizontal scale represents transversely aligned center points of FIG. 1, while the vertical scale denotes the horizontal geophone-to-source spacing of each locational trace. Transversely aligned traces are seen to have substantially different horizontal spacings where at least two locational traces are transversely aligned. Note that after rapid buildup in the magnitude of the horizontal spacing of each locational trace, a maximum incremental spacing factor, Dmax–Dmin, is reached for the six locational traces associated with crossline $CL_{11}$, i.e. traces associated with center points $C_{11}$, $C_{33}$, $C_{55}$, $C_{77}$, $C_{99}$ and $C_{121}$ of FIG. 1 where "Dmax" is defined as maximum horizontal spacing between a source-detector pair in crossline $CL_{11}$ and "Dmin" is the minimum horizontal spacing of another source-detector pair in the same crossline $CL_{11}$. This maximum continues (reading left-to-right on the horizontal scale) for each series of six locational traces associated with crosslines $CL_{12}$—$CL_{24}$. There is a slight decrease for the six locational traces at crossline $CL_{25}$, however, before the incremental spacing factor returns to the first-mentioned value.

Figure 4:
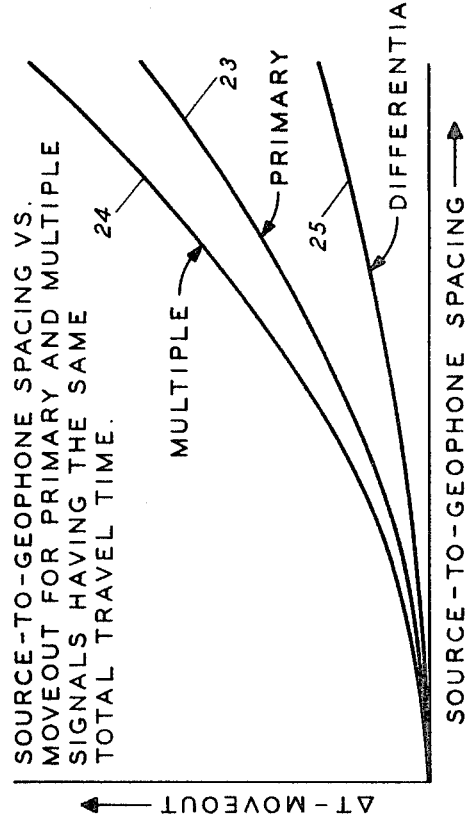
FIG. 4 is a plot of the source-to-geophone horizontal spacing of an individual source-geophone pair of the array of FIG. 1 illustrating how normal moveout for primary and multiple signals from different reflectors within an earth formation, but having the same recording time, varies with source-geophone pair spacing.

FIG. 4 illustrates the importance of having locational traces with substantially different source-to-geophone horizontal spacings. In the Figure, the normal moveout of a primary signal at a given record time (curve 23) and a multiple signal at the same record time (curve 24) are plotted as a function of geophone-to-source spacing. Normal moveout is the difference in arrival times of signals at different geophone stations due to the differences in source point-to-geophone distance. The normal moveout of the multiple signal is seen to increase more rapidly than the primary signal due to the increase in average velocity with depth of seismic energy in the earth to produce a differential curve 25. For a better understanding of the Figure, one must first understand that the present invention contemplates a field recording and processing method which includes:

(i) firstly, a field procedure for systematically producing a series of locational traces capable of being transversely aligned along a series of imaginary lines perpendicular to the line of survey in which the cross aligned traces have substantial source-to-geophone spacing differentials, and (ii) secondly, a processing procedure for selecting from all the recorded traces, the cross aligned locational traces and then processing the aforementioned selected traces by summing procedures, after normal moveout and static corrections have been applied.

If conventional normal moveout and static corrections are made for the primary signals in each trace only, therefore, when the traces of the present invention are summed, the multiple signals will be degraded relative to the primary in accordance with the incremental amplitude of differential curve 25.

Normal moveout and static corrections can be introduced to the traces by several methods well known in the seismic art; one manner for introducing normal moveout corrections is shown in U.S. Pat. No. 2,838,743 of O. A. Fredriksson for "Normal Moveout Correction with Common Drive for Recording Medium and Recorder and/or Reproducing Means."

After normal moveout and static corrections have been made to the traces ("corrected" traces), it is convenient to think of all the hypothetical reflecting depth points represented in a locational trace as being directly below respective center points of the grid of FIG. 1. It becomes reasonable also to think of each trace as if it has been recorded by a source-geophone pair located at the same center point. After all the traces produced by different source-geophone combinations have been subject to appropriate, individual normal moveout and static corrections, then they can be considered as representing traces derived from reflection points directly below center points in a common datum plane. As illustrated in FIG. 1, corrected traces thus will represent reflection points as if the reflected energy had been detected and originated at the appropriate center points. It should be understood that where there are dipping subsurface beds and variations in the velocity of transmission of seismic energy with depth, the depth points on the reflecting horizon may not be vertically aligned below the center points of the grid. However, for working convenience in the preliminary steps of processing of the seismic data in accordance with the present invention, the corrected locational traces are treated as though they were representative of reflection point locations immediately below the center points in FIG. 1.

The operating concepts of the method of the present invention may be better understood with reference to FIGS. 5 and 6 and FIGS. 7 and 8a, 8b. These figures diagrammatically illustrate the improvements in collecting, processing and displaying seismic information as accomplished by the method of the present invention.

FIG. 5 shows a typical cross set of center points $C_{11}$, $C_{33}$, $C_{57}$, $C_{77}$, $C_{99}$ and $C_{121}$ associated with the centerline $CL_{11}$ of FIG. 1. FIG. 5 represents an elevational view of the earth cut along a vertical plane normal to a symmetrical line intersecting coordinate position $X_1$ for the aforementioned cross set of center points. It will now be appreciated by one having a knowledge of the beam steering process such as described in the aforementioned Stephenson application Ser. No. 416,947 that if the cross traces associated with the center points $C_{11}$, $C_{33}$...$C_{121}$ are beam steered by imposing suitable progressively related time delays among the traces, and then compositing (by summing), a new set of crossbeam steered traces will be produced. This new set of cross-steered traces will be a set of directional traces all of which will be associated with the in-line coordinate $X_1$ and the individual beam steered traces will represent energy received from different individual directions in the earth. FIG. 5 represents these different directions to which the signals are related in the cross-steered traces as sectors 22a to 22m in a vertical plane passing through coordinate position $X_1$ perpendicular to the line of survey. The cross sets of traces are associated with crosslines of center points whose maximum total cross offset lengths, say between points $C_{11}$ and $C_{121}$ of FIG. 1, are based upon consideration of several factors, among which are: (1). each cross set of traces should not contain signals which have been reflected from a stratum having excessive curvature (an excessively curved stratum is a stratum whose associated reflected seismic signals upon recordation and processing, by beam steering, are prevented from having meaningful inphase summation); and (2). each cross set of traces can contain signals having similar but different moveouts, but such signals capable of being distinguished using beam steering processing techniques in accordance with the present invention.

For determining the location of sharply curved flanks of salt domes, for example, it can be very helpful to use arrays whose maximum total cross offset length of center points is rather short, say typically 300 feet. But for more gently curved beds, arrays can be used which provide much longer maximum total cross offset length of center points, say 3000 feet or more. Further, it may be desirable (even in the case of collecting data associated with gently curved strata) to use arrays which provide rather short maximum total cross offset length of center points, say a typical cross offset length well below 300 feet. In such cases, the economic advantage gained in the collecting and processing of the data has been found to offset any loss in directivity of events associated with one or more of the sectors 22a, 22b, 22c, etc., of FIG. 5. In such applications, the detector spacing is preferably constant, ranging between 50—500 feet.

Figure 6:
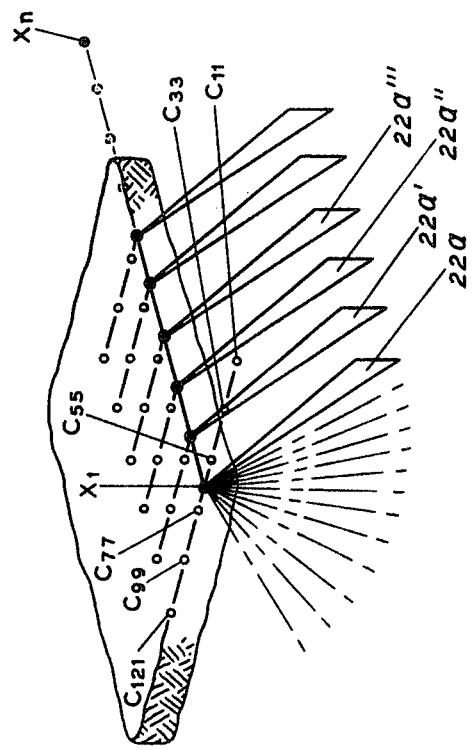
FIG. 6 is a perspective view, partially in section, of the earth formation of FIG. 1 taken along a vertical plane containing a line parallel to and coincident with the line of survey of the array of FIG. 1 and illustrating formational sectors having a common azimuthal angle which can be investigated using the beam steered traces of FIG. 5.

FIG. 6 shows several sets of cross center points in lines perpendicular to the line of survey, and indicates schematically how, by beam steering of the cross traces associated with these cross sets of center points, several sets of cross-steered directional traces may be produced. All of the directional cross-steered traces in any one set are associated with a common symmetrical coordinate position $X_1$—$X_n$, but each of the individual cross-steered traces in any one of the sets represents a different direction into the earth.

In FIG. 6 the earth formation is illustrated in longitudinal and vertical section to schematically illustrate how individual traces in any one of the cross-steered sets of traces can be selected and displayed to indicate reflection signals having common azimuthal arrival angles. In FIG. 6, the steering sectors 22a, 22a', 22a'', etc. have been selected from sets of cross-steered traces for placement side-by-side on a record of identify directionally distinct reflection signals having common azimuthal angles of emergence with respect to a vertical plane through coordinate positions $X_1$—$X_n$.

FIG. 7 illustrates one form of useful display of the cross-steered directional traces schematically illustrated in FIG. 6. In this display, the directional cross-steered traces have a common cross moveout and are placed side-by-side in accordance with a given position along a line parallel to the line of survey, i.e., through coordinate locations $X_1$—$X_n$ of FIG. 6. All of the side-by-side traces have the same cross moveout and become one page 17 of a set of section records having as many pages as are beam steered sectors of the search. In this manner a book 18 of separate directional section records, each of which represent a multistation spread, is formed. The coherent wiggles on the traces of each page 17 of the book 18 can be visualized in three dimensions as representing signals having a particular arrival azimuth relative to particular coordinate locations parallel to the line of survey. Of course other displays may be employed. For example, each series of directional cross-steered traces associated with a particular in-line position may be placed side-by-side on each record. Adjacent traces would then give prominence to signals having different angles of emergence at each in-line position in the manner of FIG. 5.

FIGS. 8a and 8b show a typical use of the records of FIG. 7. As illustrated in FIG. 8b, directional traces identified with locational center point groups A, B and C having midpoint coordinate locations along a line 30 above an anticlinal subsurface structure, have been produced. The anticline is not aligned parallel to the survey line but is indicated by the contour lines 31, askewed with respect to a vertical plane coincident with the survey line. To allow identification of the anticline, the individual records constituting each set or group of cross-steered records associated with center point groups A, B and C are illustrated at 32, 33 and 34 in FIG. 8a. Each set of cross-steered records 32, 33 and 34 have been scanned for maximum prominence of reflection-wave events. Identification of the same event in the sets of records 32, 33 and 34 can be established by associating signals having about the same axis positions along the record. In FIG. 8a, the traces of sets of cross-steered records 32, 33 and 34 have been scanned with results as indicated. The same reflection event can be followed through these subsets of directional traces so as to allow a seismologist to view simultaneously ultralong record sections to identify continuous configurations in the earth formation over a rather large surface area. Inferences about the strike and dip of the underlying stratum can be drawn from the apparent offset of the indicated events in the various angles of emergence as represented by the pages of each set of cross-steered records.

It will be appreciated by one skilled in the art that each page of the sets of cross-steered records represents traces having a common angle of emergence and represents individual in-line positions along line 30 of FIG. 8b. However, each trace on one of the cross-steered directional records of FIG. 8a represents a composite of several traces of the original seismic data; it also represents seismic energy received from a particular direction in the subsurface denoted by particular cross moveout. The cross moveout is indicated as being one of the 13 angles of emergence illustrated in FIG. 6. In practice, the common direction of emergence through which the traces are scanned would be designated by a common cross moveout in milliseconds.

If, in the beam steering operation, 13 different directions in the earth were chosen for examination, as illustrated in FIG. 6, each set of cross-steered records 32, 33 and 34 would contain a total of 13 different records; further, if geophone spread of such center point group A, B or C contains 24 geophones, each of the 13 different records would contain 24 traces. Each of the 13 records represents a distinct cross direction or angle of emergence into and out of the earth.

It will be appreciated that each set of cross-steered records 32, 33 and 34 related to center point groups A, B or C of FIG. 8b and at least one of the 13 records of each set can be used just as a conventional profile of traces is used, to derive the in-line and cross moveout of any event that appears prominently on the sets of traces. The in-line moveout is usually defined as the difference between the time that the wave front representing an event arrives at the first trace on the left-hand side of the record and the time that the wave front arrives at the last trace on the right-hand side of the record. The true direction of the angle of azimuthal arrival is fixed in accordance with the present invention by determining the cross and in-line components of moveout to thereby fix the actual direction from which the signal emerged. For example, one may locate one reliable event on one of each set of cross-steered records 32, 33 and 34 that is unmistakably evidenced by comparisons to the neighboring 12 records of that set as showing that event best. For example, in FIG. 8a, the event in the traces associated with sectors $i$, $g$ and $e$ has been selected as showing that event best. This may be done by apparatus similar to that described in U.S. Pat. No. 3,149,302 for "Information Selection Programmer Employing Relative Amplitude, Absolute Amplitude and Time Coherence" issued Sept. 15, 1964, to W. W. Klein et al., or by human inspection. When one has found which one of the cross-steered records displays that event more strongly, one has by that act also found the cross moveout of that event because each individual record of the set corresponds to a particular individual cross moveout. One can proceed further to interpolate moveouts located between original moveouts of each set of records, if desired.

After the step is taken to determine the cross moveout, the in-line moveout can be determined by human inspection. It is apparent that of all of the cross-steered records comprising each record of each record set 32, 33 and 34 there is one record which shows a chosen event most clearly (which, as previously explained, fixes the cross moveout of the event). Such a record also provides the best traces to use in determining in-line moveout of the event. This is determined merely by measuring the disparity in arrival time of the chosen event between the left-hand and right-hand traces of that record.

Figure 9:
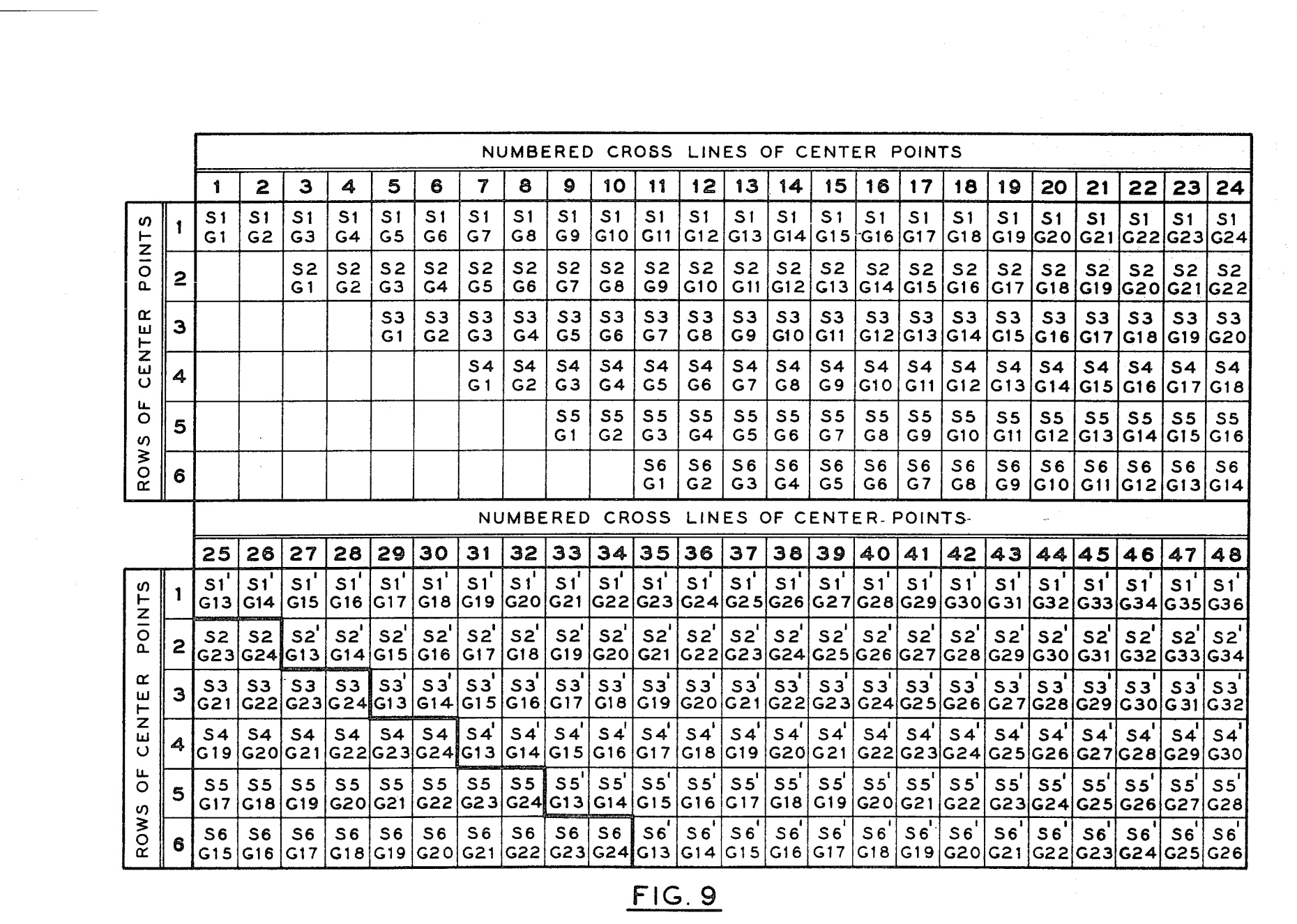

FIG. 9 illustrates the schedule by which the corrected traces of FIG. 1 are combined. These traces have been previously produced at geophone stations $g_1$, $g_2$, etc., of FIG. 1, by sequentially firing seismic sources at source points $S_1$, $S_2$, etc. As shown, across the top of FIG. 9, the crossline locations of the center points associated with the traces are indicated. Along the left-hand side, the in-line coordinates of the locational traces are shown to identify particular positions of the locational traces along rows parallel to the line of survey. Corrected traces in each vertical column $CL_1$, $CL_2$...$CL_{48}$ are identified by particular designation as to source point and geophone station producing the trace. It will be appreciated that the six corrected traces combined along each of the crosslines $CL_{11}$, $CL_{12}$...$CL_{24}$ relate to energy produced at source points $S_1$, $S_2$...$S_6$ along offset oblique line 13 of FIG. 1 and received at geophone stations $g_1$, $g_2$...$g_{24}$ along the spread line of FIG. 1. Further, the six corrected traces combined along each crossline $CL_{35}$, et seq, are seen to relate to energy produced at source points $S'_1$, $S'_2$...$S'_6$, along offset oblique line 14 of FIG. 1 and received at geophone stations $g_{13}$—$g_{36}$. Between crosslines $CL_{24}$ and $CL_{35}$, the columns of the corrected traces are mutations of the aforementioned arrangements. The locational traces along crossline $CL_{29}$, for example, relate to the energy produced at source points $S'_1$, $S'_2$ and $S'_3$, and received at geophone stations $g_{17}$, $g_{15}$ and $g_{13}$, as well as the energy produced at source points $S_4$, $S_5$ and $S_6$ and received at geophone stations $g_{23}$, $g_{21}$ and $g_{19}$.

Figure 10:
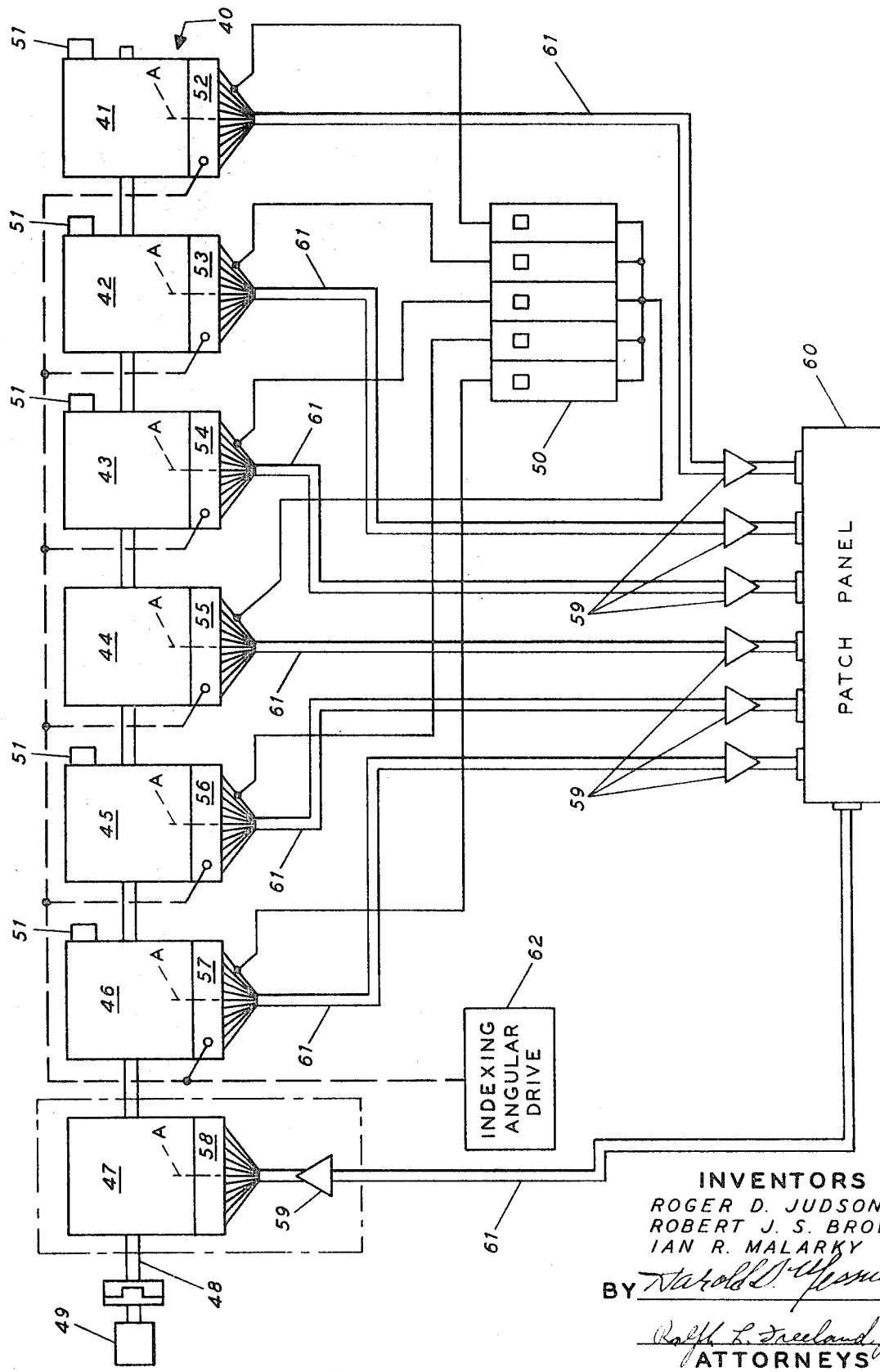
FIG. 10 is a block diagram of seismic data processing equipment for regrouping the traces in accordance with the schedule of FIG. 9, and then beam steering the resulting cross sets of records to produce subsets of directional traces.

FIG. 10 illustrates recording and playback equipment for performing the selection and processing steps of the method of the present invention. In the description which follows, the operation of the equipment in FIG. 10 should be apparent when taken in conjunction with the preceding description.

As shown, magnetic playback and recording system includes seven drums 41—47, each mounted on a shaft 48. Each of the drums is rotated on the shaft 48 at a uniform speed by motor 49. Separate magnetic tapes constituting the corrected locational traces associated with seismic energy received at geophone stations $g_1$, $g_2$...$g_{24}$ by the sequential firing of seismic sources $S_1$, $S_2$...$S_6$ of FIG. 1, are placed on the playback drums 41—46. A plurality of transfer tapes are placed on rerecording drum 47.

More particularly, magnetic tapes on the playback drums 41—46 are first aligned with a common time reference. A five-channeled counter 50 samples the time break channel of each of the magnetic tapes on the playback drums 41, 42, 43, 45 and 46. By comparing the time difference between the time breaks on the reference time break channel of the magnetic tape located on drum 44, the channels of the counter give indications of time differences. By the adjustment of knobs 51, each drum may be differentially rotated relative to the shaft 48 to align the respective time break channels. Ordinarily, an alignment within 1 millisecond of the reference time break is desired.

Once the time break channels on the magnetic tapes are aligned, the traces recorded in magnetic form on each of the magnetic tapes are ready for sampling by playback heads 52—57. Electrical signals representative of the various magnetic traces are transferred to a patch panel 60 by way of conductor cables 61. In patch panel 60, the various channels are rearranged in accordance with the preceding teachings about regrouping traces to associate them with crosslines of center points perpendicular to the line of survey of the collection array (e.g., regrouped in accordance with the schedule depicted in FIG. 9), and then retransmitted to a set of recording heads 58 adjacent to a plurality of magnetic tapes wound on recording drum 47. Multichannel amplifiers 59 amplify the electrical signals in the respective channels sufficiently for transferring the traces at the playback drums 41—46 and rerecording them on the multiplicity of the recording tapes wound on recording drum 47.

In one form of the present invention, it is contemplated that 24 recording tapes will be wound about the recording drum 47. It is also contemplated that each playback record tape on each playback drum 41—46 will contain 24 separate traces adjacent to a like number of playback heads. Adjacent each tape on the recording drum 47 will be six recording heads constituting a part of the set of heads 58, these six recording heads being connected through patch panel 60 to playback heads 52—57 adjacent to playback drums 41—46. At the recording drum 47, each tape will have produced thereon a six-trace record regrouped in accordance with the trace combination schedule depicted in FIG. 9.

To produce beam steered, directional traces (after traces have been regrouped in accordance with the schedule of FIG. 9) the processing steps previously described with reference to the processing equipment of FIG. 10 are, in the main, repeated.

The 24 regrouped record tapes, each of which being associated with cross-aligned center points, are first removed from the recording drum 47. Next, the recording and playback drums 42—47 (as well as associated recording and playback equipment) must be modified: (i) The number of playback drums must be increased from six (as shown in FIG. 10) to 24, assuming that 24 regrouped records have been produced by the regrouping process in FIG. 10; (ii) each of these modified, 24 playback drums is also provided with a modified playback head for the purpose of producing a six-trace summation scan per revolution of each modified playback drum; and (iii) each of the modified playback heads is also provided with turning means (not shown) for rotating the modified playback head about a commonly aligned axis perpendicular to the surface of each modified playback drum. This axis is labeled A and is shown in phantom line in FIG. 10. After the modified playback drums and heads have been remounted to their supports, the modified playback heads are mechanically connected to indexing drive 62. It is evident that the modified playback heads can be pivoted by means of the indexing drive 62, in unison, about the axes A to a common steering angle as all of the modified playback drums are driven in rotation. After one revolution of the modified playback drums, the modified playback heads can be pivoted to another steering angle and the process repeated so as to give prominence to signals at a series of preselected steering angles. The electrical signals read by all modified playback heads are added at the preselected scanning angles across each record and then transmitted through the same cable conductors 61 and patch panel 60 to the recording drum 47 containing a plurality of magnetic tapes. In patch panel 60, the various channels are rearranged in accordance with the preceding teachings to provide a subset of cross-steered-directional traces giving prominence to signals in various selected steering angles and with respect to a particular series of angles and coordinate locations, as previously described. Further, by virtue of the fact that the regrouped traces are associated with source-geophone pairs having substantially different horizontal spacing, suppression of multiple signals relating to the primary signals, as previously described, is assured.

MODIFICATIONS

Field collection techniques using the source point and geophone array of FIG. 1 can be modified to simulate conventional "roll-along" field collection techniques customarily used in the seismic industry. As previously mentioned, conventional "roll-along" techniques produce a first series of recordings from a source and detector spread in one location, and then produce a second series of recordings made with a source advanced a certain distance and detectors also advanced a similar distance. By moving the source and detector spread equivalent in-line distances, traces are recorded which cover common depth points many times. In the present embodiment of the invention, recordings are made by moving a seismic source, in sequence, from source point to source point along the oblique lines 13 and 14 of FIG. 1 as the detector spread is advanced distances equivalent to the in-line spacing between source points. In the embodiment, the switch console 17 of FIG. 2 is modified to include contact points which connect, in sequence, to appropriate geophones of the spread to simulate advancement of the geophones from station to station in incremental steps equal to the in-line advances of the sources from source point to source point.

It was previously indicated with reference to the array of FIG. 1 that the in-line spacing between adjacent source points $S_1$, $S_2$, etc., was equal to twice the in-line spacing between adjacent geophone stations $g_1$, $g_2$, etc. If locational traces are produced by sequentially firing the sources at source points $S_1$, $S_2$, $S_3$, etc., as the geophone spread is advanced, in sequence, distances equivalent to that between two adjacent geophone stations, the buildup of the center points associated with the resulting locational traces will be less rapid than previously described. In this regard, it has been found that the buildup of center points is not as pictured in FIG. 1 but is such that the center points $C_1$, $C_{27}$, $C_{53}$, $C_{79}$, $C_{105}$ and $C_{131}$ linked by phantom line 9 in FIG. 1, define the left boundary of the center point grid. Accordingly, it is not until locational traces associated with the center points of crossline $CL_{21}$ have been produced that a full complement of six locational traces per each cross set of center points is achieved.

FIG. 11 plots the horizontal geophone-to-detector spacing of each locational trace produced by "roll-along" geophone shooting as a function of cross center point location. In FIG. 11, the horizontal scale represents transversely aligned locational traces of FIG. 1 modified by using the "roll-along" collection technique, while the vertical scale denotes the geophone-to-source spacing of plotted locational traces. It is seen that the maximum horizontal source-to-detector spacing of the traces is approximately constant proceeding from left to right across the plot at about 4800 feet for the array of FIG. 1. The minimum horizontal spacing, after reaching a minimum value, about 200 feet, at crossline $CL_{24}$, increases at the crosslines $CL_{25}$, et seq. Note also that at crossline $CL_{21}$, a full complement of six locational traces are located in transverse alignment and can be combined and beam steered using the processing equipment of FIG. 10 in the manner previously taught. It should be noted that the incremental spacing factor, Dmax–Dmin, reaches a maximum value of 4400 feet at $CL_{24}$ and a minimum value of 3000 feet at $CL_{37}$, where "Dmax" is defined as maximum horizontal spacing between a source-detector pair associated with a selected crossline of center points across the plot of FIG. 11, and "Dmin" is the minimum horizontal spacing of another source-detector pair in the same crossline of center points.

As previously mentioned, each cross set of locational traces may be recorded using different recorder channels. In some cases, it may be desirable that the individual traces associated with each cross set of center points be recorded on the same channel of the recorder. Although each of the locational traces recorded would require different moveout corrections, summation could be accomplished without channel transposition.

In this embodiment of the invention, the locational traces are recorded using "roll-along" collection techniques previously described but modified in that advancement of the source from source point to source point proceeds in reverse order to that previously described. In this embodiment of the present invention, the source of seismic energy is placed first at source point most remote from the line of survey, viz, source point $S_6$ along oblique line 13, and energized, and then, as the detector spread is advanced in the same direction as previously described (a distance equivalent to the spacing of two geophone stations) the source is advanced in an opposite direction, to source point $S_5$. By this arrangement, the buildup of locational traces associated with cross sets of center points is quite abrupt, initially being along crossline $CL_{11}$, along arrows 10 of FIG. 1. Furthermore, it can be appreciated that the locational traces aligned along crossline $CL_{11}$ have been recorded on the same channel since, in each case, the locational traces associated therewith have been received by the same geophone, at least for each sequence of six shots.

FIG. 12 depicts the horizontal source-to-geophone spacing of the locational traces produced by the reverse roll-along field collection method previously described. As shown, the horizontal spacing is plotted along the vertical scale while the crossline of center points is plotted along the horizontal scale. Across the top is depicted the channel number of a 24 channel recorder. The traces recorded per sequence of six shots are associated with cross sets of center points that have common channel numbers. The incremental spacing factor (Dmax–D- min) per each source-geophone pair remains at a maximum value of about 4200 feet for the locational traces recorded on channel numbers 2—15 of the recorder. The locational traces related to channel numbers 16—24, however, are seen to provide horizontal source-to-geophone spacing of less incremental magnitude falling to minimum value of 2200 feet at channel number 24.

Since the omnidirectional three-dimentional wave front produced by each seismic source originates from a source point always more offset in the same direction relative to the geophone stations, the field procedure as practiced in accordance with FIG. 1 provides locational traces which give the appearance of receiving seismic energy from the same direction with respect to the line of survey and is often referred to as a unilateral field collection procedure.

However, in some field procedures it may be desirable to position the source points on both sides of the geophone stations in an arrangement whereby the locational traces are located on both sides relative to the line of survey. In such an arrangement, the energy placed at the source points reaches the geophones at first one direction then another direction relative to the line of survey and is, accordingly, referred to in the seismic art as bilateral field collection methods.

FIGS. 13 and 14 illustrate two geophone and source point arrays providing bilateral field collection of locational traces.

In FIG. 13, the geophone spread is equispaced along the line of survey 65 while the source points A, B, C, D, E, F, A', B', C', D', E' and F' are located along two oblique lines 66 and 67 which intersect the line of survey at a common angle $\beta$, preferably equal to about 26½°. In this arrangement, the source points A, B, C, A', B' and C' are seen to be located on one side of the line of survey, while source points D, E, F, D', E' and F' are located on the other side of the line of survey. Across the bottom of the Figure, the spacing of the geophone stations as well as the designation thereof, are plotted; as shown, the spacing is constant from station to station. Along the left side, the oblique spacing of the source points is indicated; as shown, the oblique spacing is also constant from source point to source point. Across the top, the center points are indicated by reference to crossline designation $CL_1$, $CL_2$ ... $CL_{25}$. As shown, the in-line spacing of the line of center points is constant and equal to one-half the distance between adjacent geophone stations. Each source point along the oblique lines 66 and 67 also has a common, constant spacing interval, the cross offset component of which being equal to (i) about the magnitude of the spacing interval between adjacent detector stations along the line of survey, and (ii) about one-half of the in-line component of the oblique spacing interval of the source points. The terminal source points on each line 66 and 67, viz, source points A and F on line 66 and A' and F' on line 67 are seen to be equal distances from the line of survey. Thus the grid of center points between all possible source-detector pairs is centered on the line of survey.

A series of records is efficiently provided by connecting, in sequence, geophones located at the stations $g_1$—$g_{36}$ to a recorder 16 through the switching console 17 shown in FIG. 2, as seismic sources at the indicated source points, are fired. Operation of the switch console is coordinated with the location of the geophone station and that of the fired source to provide roll-along collection of the locational traces in the manner previously taught. Briefly, the procedure proceeds from left to right as viewed in FIG. 13. Initially, geophones at stations $g_1$—$g_{24}$ are connected to the recorder 16 and, as a source at source point A is energized, a 24 trace record is produced. Each locational trace is identified with a particular center point midway between source point A and the particular geophone station $g_1$—$g_{24}$. The switch console is then activated to connect geophones at stations $g_3$—$g_{26}$ to the recorder to simulate advancement of the geophone spread along the spread line of survey a distance equal to the in-line spacing between the last used source point (source point A) and the adjacent source point in the next obliquely aligned source point (source point B). Source point B has an offset cross distance with respect to the line of survey different from that of source point A so that a source located at source point B will produce another set of locational traces identified with center points substantially parallel to the line of survey, but offset from the first line of center points. There are, however, a substantial number of locational traces associated with center points in cross alignment with the first produced line. The process is then repeated as sources are located at the remaining source points along lines 66 and 67. Where the geometry of the source point and geophone station are as shown in FIG. 13, it can be seen from the typical set of center points of crossline $CL_{24}$ that the in-line and cross spacing between adjacent center points are equal to each other. It can also be seen that the center points of crossline $CL_{24}$ relate to particular source point-geophone station pairs and have a rather significant horizontal spacing factor. For example, compare the lengths of the dotted lines between the following source-point-geophone station pairs: source point (A)—geophone station $g_{24}$ and source point (D)—geophone station $g_{18}$.

In FIG. 14, the geophone spread is also located along the line of survey; its spacing is constant from station to station as indicated across the bottom of the Figure. The geometry of the array of FIG. 14 differs from that of FIG. 13 in that each group of six adjacent source points are located along two oblique lines diverging from the line of survey in the direction of survey. For example, six adjacent equispaced source points G, H, I, J, K and L are located along two diverging oblique lines 68 and 69. Similarly, the next six adjacent equispaced source points G', H', I', J', K' and L' are located along the oblique lines 70 and 71. Along the right-hand side of the Figure, the oblique spacing of the source points is indicated and, as shown, is constant from source point to source point.

All the oblique lines 68—71 may be extended to intersect the line of survey at a common angle of intersection B (preferably about 26½°) from the same direction. Lines 68 and 70, however, have a positive slope with respect to the line of survey in the direction of the survey arrow 73, while lines 69 and 71 have negative slopes. Note that similarly sloped lines lie on the same side of the line of survey.

Intersection of adjacent lines 68, 69 and lines 70 and 71 with the line of survey are equally spaced along the line of survey. Accordingly, it can be said that a point midway between each set of intersection points of like sloped lines, say lines 68 and 70, is coincident with the point of intersection of an oppositely sloped but adjacent line, say line 69 with the line of survey. To provide a grid of center points of substantially equalized and uniform center point density, the source points along any one oblique line have a cross component equal to (i) about the magnitude of the spacing interval between adjacent detector stations, and (ii) about one-half of its in-line component parallel to the line of survey. The terminal source points on adjacent lines, say source points I and L of lines 68, 69, are seen to be equal distances from the line of survey. Thus, the grid of center points between all possible source-detector pairs is centered on the line of survey.

Spacing and cross alignment of the center points is indicated with reference to the scale across the top of FIG. 14. Where the geometry of the array is as shown in FIG. 14, it can be seen from the typical set of center points of crossline $CL_{21}$ that the in-line and cross spacing between center points is equal to about one-half of the distance between adjacent geophone stations. Further, each set of center points, as typified by the center points of $CL_{21}$, provide a significant horizontal spacing factor. For example, compare the lengths of the dotted lines between source point J and station $g_{15}$ and source point L and station $g_{11}$.

In operation, the roll-along collection method previously described is used. These methods proceed from right to left, as viewed in FIG. 14. Initially, geophones at stations $g_1$—$g_{24}$ are connected to the recorder 16 of FIG. 2 through the switch console 17. A recording of energy received at these stations is made as a seismic source at source point G is fired. A second recording is made with the geophones at stations $g_3-g_{26}$ connected to the recorder and the seismic source is located at source point H more offset from the line of survey than the source point G. As previously mentioned, the roll-along collection technique is as if the geophone spread is advanced between recordings a distance equal to the in-line spacing between adjacent source points. In this way, locational traces are provided which can at least be grouped with cross sets of center points perpendicular to the line of survey. Where the geometry of the source point-geophone array is as shown in FIG. 14, the cross and in-line spacing of adjacent center points are equal.

Processing of the traces produced by the source point-geophone arrays of FIGS. 13 and 14 is in accordance with the teachings previously described. After normal moveout and static corrections have been applied, the traces can be rearranged to group the traces associated with sets of center points perpendicular to line of survey. In FIGS. 13 and 14, the regrouping schedule of traces is as indicated for the typical sets of center points of crosslines $CL_{24}$ and $CL_{21}$, respectively. Then, the rearranged traces are beam steered in the manner previously described with reference to the processing equipment of FIG. 10.

Table I is a plot of the incremental horizontal spacing factor, Dmax–Dmin, as a function of center point location for the geophone-source point arrays of FIGS. 13 and 14, respectively. The factor, Dmax–Dmin, is plotted on the left-hand side of the Table, and center point location is plotted along the horizontal scale of the Table.

TABLE I

| Incremental spacing factor, in hundreds of feet (FIGURE 13) (Dmax.–Dmin.) | 37 | 32 | 32 | 37 | 37 | 36 | 37 | 40 | 42 | 37 | 32 | 32 | 32 | 27 | 27 | 31 | 31 | 31 | 37 | 42 | 40 | 37 | 36 | 37 |
|---|---|---|---|---|---|---|---|---|---|---|---|---|---|---|---|---|---|---|---|---|---|---|---|---|
| Incremental spacing factor, in hundreds of feet (FIGURE 14) (Dmax.–Dmin.) | 31 | 30 | 31 | 36 | 36 | 30 | 28 | 33 | 33 | 30 | 28 | 31 | 31 | 30 | 30 | 36 | 36 | 30 | 28 | 32 | 32 | 30 | 28 | 31 |
| | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |

CROSS LINES OF CENTER POINTS

It has been found that the incremental horizontal spacing factor of all source-geophone pairs of FIG. 13 (Dmax–Dmin), vary from a maximum of 4200 feet at $CL_{29}$ and $CL_{40}$ to a minimum of 2700 feet at $CL_{34}$ and $CL_{35}$ while the incremental spacing factor of the source-geophone pairs of FIG. 14 is seen to vary from a maximum of about 3600 feet at $CL_{24}$, $CL_{25}$, $CL_{36}$ and $CL_{37}$ to a minimum of 2800 feet at $CL_{27}$, $CL_{31}$, $CL_{39}$ and $CL_{43}$.

While certain preferred embodiments of the invention have been specifically disclosed, it should be understood that the invention is not limited thereto as many variations will be readily apparent to those skilled in the art. For example, reciprocity in the positions of the geophones and sources vis-a-vis the line of survey, is intended as an acceptable alternative in carrying out the method of the present invention, that is to say, the geophone spread could be located along the oblique lines and sources aligned along the line of survey, instead of, as described hereinbefore, without departing from the scope of the present invention. Thus, the invention is to be given its broadest possible interpretation within the terms of the following claims:

We claim:

1. In collecting and processing of cross-steered seismic data containing high signal-to-noise ratios for determining the three-dimensional stratal configuration of an earth formation, a method for simultaneously improving the primary-to-multiple signal ratios of said seismic data, comprising
   a. generating a record of seismic signals from seismic discontinuities within said earth formation, including multiply reflected signals, by employing an array of seismic sources and seismic detectors positioned such that center points between all possible source-detector pairs form a two-dimensional grid of center points along a line of survey, said array of sources and detectors being positioned with respect to said line of survey so as to provide a plurality of source points aligned with one of (i) a spread line substantially parallel to said line of survey and (ii) a series of oblique lines intersecting said line of survey at a common oblique angle, and a plurality of detector stations aligned with the other of said spread line and said series of oblique lines, said recorded signals being the output of said seismic detectors,
   b. by means of automated data processing means, statically and dynamically correcting said recorded signals with said two-dimensional grid of center points so as to produce a series of corrected traces, said series of corrected traces containing cross sets of traces associated with crosslines of center points of said center point grid substantially perpendicular to said line of survey, at least one trace of each cross set of traces being a product of a respective source-detector pair having a substantially different horizontal spacing than at least one other source-detector pair of other traces associated with said each cross set of traces, and
   c. by means of automated data processing means, beam steering each cross set of traces to produce a subset of cross-directional traces having improved signal-to-noise ratios for use in determining the three-dimensional stratal configuration of said earth formation, said multiply reflected signals in each of said cross set of traces also being significantly attenuated as said traces are beam steered.

2. The method of claim 1 in which each of said cross lines of center points associated with a respective cross set of traces has a maximum total cross offset length of sufficient magnitude to permit processing of said sets of cross traces by beam steering so as to produce statistically related subsets of cross steered, cross-directional traces.

3. The method of claim 2 in which said maximum total cross offset length of each of said crosslines of center points is less than 3,000 feet.

4. The method of claim 2 in which said maximum total cross offset length of each of said crosslines of center points is less than 300 feet.

5. The method of claim 2 in which said array of source and detectors are arranged so that said grid of center points between all possible source-detector pairs forms a grid of equispaced center points of uniform center point density.

6. The method of claim 1 wherein said plurality of seismic source points are aligned with said series of oblique lines intersecting said line of survey, and said detector stations are positioned on said spread line coincident with said line of survey.

7. The method of claim 1 in which said first-mentioned step includes the substeps of:
   a. positioning a plurality of detectors along said spread line coincident with said line of survey and a seismic source positioned at a first source point having a predetermined cross offset with respect to said line of survey whereby center points between all detector-source pairs produce a line of center points parallel to said line of survey, said detectors having a substantially constant station-to-station spacing between 50—500 feet,
   b. exciting said source to produce a seismic disturbance,
   c. recording the output signals of each detector following excitation,
   d. positioning along a first oblique line intersecting said last-used source point another seismic source at another source point more advanced in the in-line direction of survey than the last-used source point, and advancing said plurality of detectors along said line of survey a distance equal to the in-line spacing between the last-used source point and said another source point, said another source point having an offset distance with respect to said line of survey different than that of the last-used source point so as to produce another line of center points between all detector-source pairs substantially parallel to the line of survey, offset from said first-produced line of center points, but having a substantial number of center points in cross alignment with said center cross points of said first-produced line, so as to define cross lines of center points substantially perpendicular to said line of survey, e. exciting said another source to produce seismic disturbance, f. recording the output signals of each detector following the last-mentioned excitation.

8. The method of claim 7 with the additional step of repeating, in sequence, substeps (d), (e) and (f) until the last-used source point along said first oblique line is at a maximum cross offset from said line of survey, so as to produce additional center points in alignment with said crosslines of center points substantially perpendicular to said line of survey, at least one center point in each crossline of center points being positioned between a source-detector pair whose horizontal spacing is substantially different than that of at least one other source-detector pair of the same crossline of center points.

9. The method in accordance with claim 8 with the additional steps of:

g. positioning, on another oblique line intersecting said line of survey at an intersection angle equal to that of said first oblique angle, yet another seismic source at yet another source point more advanced in the in-line direction by said in-line spacing of said plurality of detectors than said last-used source point, and advancing said plurality of detectors along said line of survey a distance equal to the in-line spacing between the last-used source point and said yet another source point, said yet another source point having an offset distance with respect to said line of survey less than that of the last-used source point, as to produce another line of center points between all detector-source pairs substantially parallel to the line of survey, h. exciting said yet another source to produce a seismic disturbance, i. recording the output signals of each detector following the last-mentioned excitation.

10. The method of claim 9 with the additional step of repeating, in sequence, steps (g), (h) and (i) until the last-used source point along said another oblique line is at a maximum cross offset with respect to said line of survey, the magnitude of said offset being about equal to that of the last-used source point associated with said first oblique line, as to define a continuous two-dimensional grid of center points.

11. The method of claim 1 in which said first-mentioned step includes the substeps of locating said detector stations on said line of survey and locating said plurality of source points on said series of oblique lines intersecting said line of survey, such that said oblique lines of source points define common slopes and common angles of intersection with said line of survey, said detection stations have a common, constant in-line spacing, each line of source points also having a constant, common oblique spacing interval between adjacent source points and including at least first and second terminal source points spaced apart on opposite sides of said line of survey, said first and second terminal source points having substantially equal offset spacings with respect to the line of survey whereby the grid of center points between all possible source-detector pairs is centered at the line of survey.

12. The method of claim 11 in which the plurality of source points is located such that the common, constant oblique spacing interval between source points defines a common oblique spacing interval between adjacent source points, the cross offset component of which being equal to (i) about the magnitude of the spacing interval between adjacent detector stations, and (ii) about one-half its in-line component parallel to the line of survey, whereby the grid of center points between all possible source-detector pairs is equispaced in both cross and in-line directions and of substantial uniform center point density.

13. The method of claim 1 in which said first-mentioned step includes locating said source points on said series of oblique lines intersecting said line of survey and locating said detector stations on said spread line coincident with said line of survey, source points along any one oblique line forming a set of source points having a constant source point interval in the oblique direction and including terminal first and second source points located on the same side of said line of survey, said series of oblique lines having common slopes and common oblique angles of intersection with said line of survey.

14. The method of claim 13 in which the plurality of source points is located such that the slopes of said series of oblique lines are similar and the common, constant spacing interval between source points along any one oblique line of source points of similar slope defines a common oblique spacing interval, the cross component of which being equal to (i) about the magnitude of the spacing interval between adjacent detector stations, and (ii) about one-half its in-line component parallel to the line of survey, whereby the grid of center points between all possible source-detector pairs is of substantial uniform center point density.

15. The method of claim 13 in which the plurality of source points is located along oblique lines intersecting said line of survey such as to define (i) a first set of source points located along one of a first series of divergent oblique lines having a positive slope and a second series of divergent oblique lines having a negative slope measured from said line of survey in the direction of the survey, and (ii) a second set of source points located along the other of said first and second series of positively and negatively sloped oblique lines, said first and second sets of source points having similar and constant spacing intervals in directions along said oblique lines, and each set of source points including terminal first and second source points located on the same side of said line of survey, the first and second series of divergent lines each being defined by common oblique angles at respective points of intersection with said line of survey and including spacing intervals at their points of intersection of constant and equal values whereby any one interval between adjacent lines of one of said first and second series of lines being bisected by the point of intersection of one line on the other of said first and second series of lines.

16. The method in accordance with claim 15 in which the plurality of source points are located such that the common, constant spacing interval between source points along any one oblique line defines a common oblique spacing interval, the cross component of which being equal to (i) about the magntidue of the spacing interval between adjacent detector stations, and (ii) about one-half its in-line component parallel to the line of survey, whereby the grid of center points between all possible source-detector pairs is of substantial uniform center point density.

17. The method in accordance with claim 1 in which the first-mentioned step includes the step of positioning said array of seismic sources and seismic detectors such that the incremental horizontal spacing factor, Dmax–Dmin is between 1,000 feet up to and including 8,000 feet where Dmax is the maximum horizontal spacing between a source-detector pair associated with center points aligned in the same line perpendicular to the line of survey and Dmin is the minimum horizontal spacing between another source-detector pair in the same center point line as said first-mentioned one source-detector pair.

18. The method in accordance with claim 1 in which said step of beam steering each cross set of traces includes the additional step of:

d. by means of automated data processing means, arranging said subsets of cross directional traces such that each subset comprises at least two directional traces with a common cross compositional moveout and different in-line positions, the different subsets having different cross compositional moveouts.

19. The method of claim 18 with the additional steps performed by means of automated data processing means consisting of:
   e. determining the cross moveout of at least one seismic event in a subset of cross directional traces by identifying which directional traces evidence said one seismic event most prominently, and
   f. determining the in-line moveout of the same one seismic event by the disparity in arrival time of said event on at least two directional traces having the same cross compositional moveout.

20. In systematically collecting seismic data along a line of survey for use in determining the three-dimensional configuration of an earth formation by interpretation of enhanced, beam-steered records of seismic signals, including multiply reflected signals, received from discontinuities within said formation, said records being locationally associated with at least two center points aligned along a series of lines perpendicular to said line of survey, an apparatus comprising:

an array of seismic source and seismic detectors positioned about said line of survey so as to define a series of source points positioned along one of (*i*) a spread line parallel to said line of survey and (*ii*) a series of oblique lines intersecting said survey line, and a plurality of detector stations aligned with the other of said spread line and said series of oblique lines, said array being arranged such that the center points between all pairs of source point-detector stations define a two-dimensional grid including sets of center points aligned along a series of lines substantially perpendicular to the line of survey, said source points and detector stations having in-line and offset spacings relative to said line of survey arranged such that at least one center point of each set of cross center points is formed between a source-detector pair having a substantially different horizontal spacing than that of at least on other source-detector pair of the same set of cross center points so that subsequently derived beam-steered traces associated with each set of cross center points of said grid contain significantly attenuated multiply reflected signals.

21. The apparatus in accordance with claim 20 in which said source points are located along said series of oblique lines and have constant, common spacing intervals between adjacent source points, and said detector stations are located along said spread line coincident with said line of survey such that intervals between adjacent detector stations are equalized, said oblique lines having common slopes and common angles of intersection at their points of intersection with said line of survey; each oblique line of source points including at least first and second terminal source points positioned on opposite sides of said line of survey, each terminal source point being of substantially the same cross offset as the other terminal source point whereby the grid of center points between all possible source point-detector station pairs are centered at said line of survey.

22. The apparatus of claim 20 in which said source points are located along a series of oblique lines, with intervals between adjacent source points being equalized, and said detector stations are located along said spread line coincident with said line of survey, with spacing intervals between adjacent detector stations also being equalized, said oblique lines having common slopes and forming common oblique angles of intersection at their points of intersection with said line of survey, each oblique line of source points including at least first and second terminal source points located on the same side of said line of survey whereby center points between all possible source point-detector station pairs are offset from said line of survey.

23. The apparatus of claim 20 in which said series of source points are located along said series of oblique lines intersecting said line of survey and includes (*i*) a first set of source points located along one of a first series of divergent oblique lines having common positive slopes and a second series of divergent oblique lines having a negative slope measured from said line of survey in the direction of the survey, and (*ii*) a second set of source points located along the other of said first and second series of positively and negatively sloped oblique lines, said first and second sets of source points having similar and constant spacing intervals in directions along said oblique lines, and each set of source points including terminal first and second source points located on the same side of said line of survey, the first and second series of divergent lines each being defined by common oblique angles at respective points of intersection with said line of survey and including spacing intervals at their points of intersection of constant and equal values whereby any one interval between adjacent lines of one of said first and second series of lines is bisected by the point of intersection of one line on the other of said first and second series of lines.

24. The apparatus in accordance with claim 20 in which the incremental horizontal spacing factor
$$Dmax - Dmin$$
is between 1,000 feet up to and including 8,000 feet where Dmax is the maximum horizontal spacing between a source-detector pair in a particular cross set of center points perpendicular to the line of survey, and Dmin is the minimum spacing of another source-detector pair in the same cross set of center points.

UNITED STATES PATENT AND TRADEMARK OFFICE
Certificate

Patent No. 3,597,727                                          Patented August 3, 1971

Roger D. Judson, Robert J. S. Brown, and Ian R. Malarky

Application having been made by Roger D. Judson, Robert J. S. Brown, and Ian R. Malarky, the inventors named in the patent above identified, and Chevron Research Company, San Francisco, California, a corporation of Delaware, the assignee, for the issuance of a certificate under the provisions of Title 35, Section 256, of the United States Code, adding the name of Francis G. Blake as a joint inventor, and a showing and proof of facts satisfying the requirements of the said section having been submitted, it is this 6th day of April 1976, certified that the name of the said Francis G. Blake is hereby added to the said patent as a joint inventor with the said Roger D. Judson, Robert J. S. Brown and Ian R. Malarky.

FRED W. SHERLING,
*Associate Solicitor.*